(12) United States Patent
Chaware et al.

(10) Patent No.: US 7,246,111 B1
(45) Date of Patent: Jul. 17, 2007

(54) CAPTURING DATABASE SYSTEM INFORMATION

(75) Inventors: Jeetendra Chaware, Andhra Pradesh (IN); Douglas P. Brown, Rancho Santa Fe, CA (US); Paul L. Sinclair, Manhattan Beach, CA (US); Thomas P. Julien, San Diego, CA (US)

(73) Assignee: NCR Corporation, Dayton, OH (US)

( * ) Notice: Subject to any disclaimer, the term of this patent is extended or adjusted under 35 U.S.C. 154(b) by 1004 days.

(21) Appl. No.: 09/923,975

(22) Filed: Aug. 7, 2001

Related U.S. Application Data

(63) Continuation-in-part of application No. 09/608,977, filed on Jun. 30, 2000.

(51) Int. Cl.
*G06F 17/30* (2006.01)

(52) U.S. Cl. .................. 707/3; 707/4; 707/10

(58) Field of Classification Search ............... 707/101, 707/102, 3, 4, 5, 100, 10, 2; 717/125, 134
See application file for complete search history.

(56) References Cited

U.S. PATENT DOCUMENTS

| | | | | |
|---|---|---|---|---|
| 5,181,017 A | * | 1/1993 | Frey et al. ................ | 709/239 |
| 5,303,383 A | | 4/1994 | Neches et al. | |
| 5,398,199 A | * | 3/1995 | Lefons ....................... | 708/446 |
| 5,495,578 A | * | 2/1996 | Rohrbaugh et al. .......... | 714/51 |
| 5,640,584 A | | 6/1997 | Kandasamy et al. | |
| 5,857,180 A | | 1/1999 | Hallmark et al. | |
| 5,864,842 A | | 1/1999 | Pederson et al. | |
| 5,872,904 A | | 2/1999 | McMillen et al. | |
| 5,884,299 A | | 3/1999 | Ramesh et al. | |
| 5,940,819 A | * | 8/1999 | Beavin et al. ................ | 707/2 |
| 5,943,666 A | | 8/1999 | Kleewein et al. | |
| 6,067,542 A | | 5/2000 | Carino, Jr. .................... | 707/4 |
| 6,223,171 B1 | * | 4/2001 | Chaudhuri et al. ........... | 707/2 |
| 6,289,334 B1 | | 9/2001 | Reiner et al. | |
| 6,298,349 B1 | * | 10/2001 | Toyoshima et al. ......... | 707/100 |
| 6,381,604 B1 | * | 4/2002 | Caughran et al. ............ | 707/10 |
| 6,414,307 B1 | | 7/2002 | Jones et al. ................ | 707/525 |
| 6,418,389 B2 | * | 7/2002 | Peter et al. ................ | 702/108 |
| 6,430,556 B1 | * | 8/2002 | Goldberg et al. ............ | 707/4 |
| 6,434,545 B1 | * | 8/2002 | MacLeod et al. ............ | 707/3 |
| 6,507,842 B1 | * | 1/2003 | Grey et al. .................... | 707/5 |

(Continued)

OTHER PUBLICATIONS

Bourbakis, N.G. Emulating Human Visual Perceptiion for Measuring Difference in Iimages Using an SPN Graph Approach, System and Sybermetric, Part B IEEE, vol. 32, Issue. 2, Apr. 2002, pp. 191-201.*

(Continued)

*Primary Examiner*—John Breene
*Assistant Examiner*—Baoquoc N. To
(74) *Attorney, Agent, or Firm*—Trop, Pruner & Hu P.C.

(57) ABSTRACT

A system emulation tool and method provides a user interface having various options that are selectable by a user for exporting environment information from one or more target database systems. The user interface in one arrangement includes multiple screens that are invoked in response to user action. Exported data from the one or more target database systems is stored in corresponding files. The user interface of the system emulation tool also provides options to enable a user to import the environment information to a test system. In the test system, the environment information is used to create an environment that emulates the environment of the target database system.

29 Claims, 22 Drawing Sheets

U.S. PATENT DOCUMENTS 6,615,120 B1 *   9/2003   Rother ........................ 701/33
6,662,312 B1 * 12/2003   Keller et al. .................. 714/38

OTHER PUBLICATIONS

Quaterman et al. Notable Computer Networks, ACM Press, vol. 29, Isse. 10, Oct. 1996, pp. 932-971.*

Orcle Corporation, "SQL Language: Reference Manual, Version 6.0," pp. 5-1 to 5-5, 5-96 to 5-97 (1990).

Eugene Wong et al., ACM Transactions on Database Systems, vol. 1, No. 3, "Decomposition-A Strategy for Query Processing," pp. 223-241 (Sep. 1976).

P. Griffiths Selinger et al., ACM, "Access Path Selection in a Relational Database Management System," pp. 23-34 (1979).

Masaru Kitsuregawa et al., Institute of Industrial Science, University of Tokyo, "Query Execution for Large Relations on Functional Disk System," pp. 159-167 (1989).

U.S. Appl. No. 09/976,634, filed Oct. 12, 2001.
U.S. Appl. No. 09/977,038, filed Oct. 12, 2001.
U.S. Appl. No. 09/976,632, filed Oct. 12, 2001.
U.S. Appl. No. 10/039,283, filed Dec. 31, 2001.
U.S. Appl. No. 09/608,977, filed Jun. 30, 2000.

D.D. Chamberlin et al., "Views, Authorization, and Locking in a Relational Data Base System," National Computer Conference, pp. 425-430 (1975).

D.D. Chamberlin et al., "Sequel 2: A Unified Approach to Data Definition, Manipulation, and Control," IBM Journal of Research and Development, vol. 20, pp. 560-575 (Nov. 1976).

M.W. Blasgen et al., "On The Evaluation of Queries in a Relational Data Base System," IBM Research Report RJ 1745, pp. 1-44 (Apr. 1976).

M.W. Blasgen et al., "Storage and Access in Relational Data Bases," IBM Systems Journal, No. 4, pp. 363-377 (1977).

Brown et al., U.S. Appl. No. 09/608,976, entitled "Method and Apparatus for Presenting Query Plans," filed Jun. 30, 2000, pp. 1-24, Figs. 1-22.

J.A. Klindt et al., U.S. Appl. No. 09/892,837, entitled "Copying a Portion of a Database Structure Associated with a Query," filed Jun. 27, 2001, pp. 1-17, Figs. 1-9.

* cited by examiner

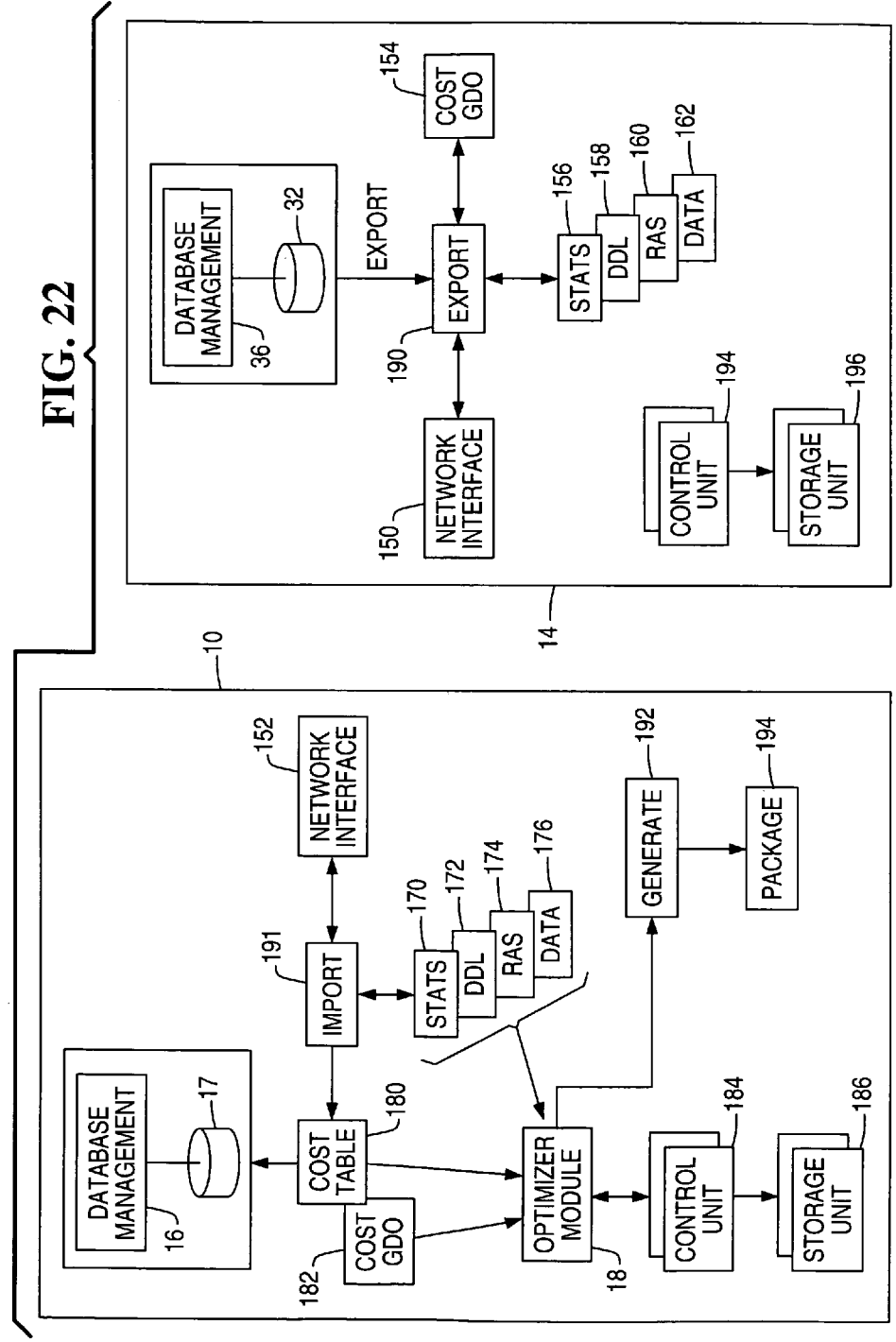

CAPTURING DATABASE SYSTEM INFORMATION

CROSS REFERENCE TO RELATED APPLICATION

This is a continuation-in-part of U.S. Ser. No. 09/608,977, filed Jun. 30, 2000.

BACKGROUND

A substantial portion of the life cycle of software development is devoted to testing. The purpose of software testing is to detect errors in programs and, in the absence of errors, gain confidence in the proper functionality of the programs. A basic premise of software testing is that programs are adequately covered once the test cycle is complete. Thus, test cases are properly selected so that some level of confidence is derived about the reliability of software from a sample set of test cases.

In testing software, particularly software in user systems that are relatively large, the test environment (often at the site of the software developer) is usually quite different from the actual operating environment. For example, a database system such as the TERADATA® database system from NCR Corporation is a multi-node, massively parallel processing system having tens or even hundreds of nodes. In addition to the complexity of such systems, the configurations and architectures of systems used by different users or customers usually differ.

The types of tests performed depend on the software applications being tested. For example, one of the goals of a database management system is to optimize the performance of queries that access data stored in the database. Given a target environment, a plan is developed for each query to achieve better performance, sometimes referred to as selecting an access plan (query plan, join plan, or strategy) with the lowest cost (e.g., response time). The response time is the amount of time it takes to complete the execution of the query on a given system. The number of alternative access plans for a query grows at least exponentially with the number of relations (or tables) participating in the query. A cost-based model can be used to compare different methods for doing a unit of work, with the most efficient method (or one of the more efficient methods) selected.

The performance of a query plan differs depending upon environmental factors relating to the hardware and software configuration of a target system (customer system). Differences in target systems usually cause the performance of query plans to differ significantly. One technique to emulate or simulate a target (customer) environment is by using expensive, custom hardware. However, such hardware-based test facilities are usually not cost-effective.

SUMMARY

In general, a method and apparatus is provided to select environment information to extract from a target database system. For example, a method includes presenting a user interface, receiving user selection through the user interface pertaining to environment information of a target database system to extract, and receiving the environment information extracted based on the user selection from the target database system.

Other or alternative features will become apparent from the following description, from the drawings, and from the claims.

BRIEF DESCRIPTION OF THE DRAWINGS

FIG. 22 is a block diagram of components of a test system and a target system according to one embodiment.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In accordance with some embodiments, a module (referred to as a "system emulation tool") enables flexible and convenient capture of environment information of a target database system. In one arrangement, the system emulation tool is executable in a system that is separate from both the target database system and a test system, or alternatively, the system emulation tool is executable in one of the target system and test system. By capturing environment information of the target database system and providing the information to the test system, target-level emulation is enabled in the test system to allow emulation of the target system for purposes of testing, debugging, or other analysis. The captured target environment information, stored in and/or mapped to appropriate tables, files, and other storage locations in the test system, is accessible by an optimizer program in the test system. In response to a test query, the optimizer program selects the lowest cost (or a lower cost) query plan in the target environment created by target-level emulation. By using target-level emulation to generate query plans and estimated performances of the query plans, queries are tuned for better performance, the impact of environment changes on queries is better modeled, and the source of problems in a database environment is determined more efficiently. This is performed in a test or analysis system that is located at a location remote from the target system. Further, the test system can be a much smaller and less sophisticated system than the target system, making testing more convenient and less expensive.

Figure 1:
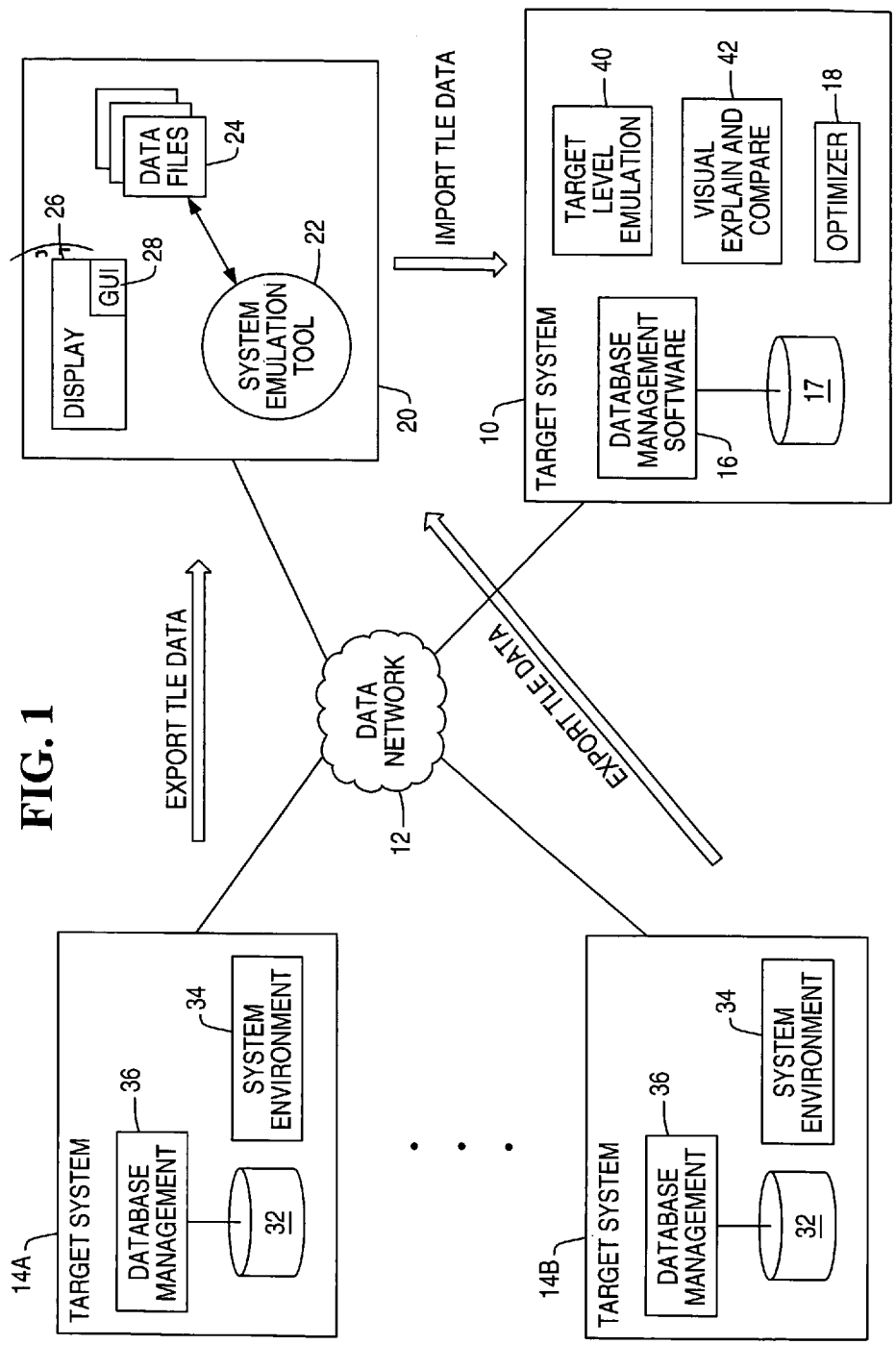
FIG. 1 is a block diagram showing interconnection of an emulation client system, a test or analysis system, and various target systems, in accordance with an embodiment.

FIG. 1 shows an example arrangement having several target database systems (14A, 14B), a test system 10, and an emulation client system 20 in which a system emulation tool 22 is executable. In one example, the target database system 14A is located at a first customer site, while the target database system 14B is located at a second customer site. Each target database system 14 includes database management software 36 that manages access of data in a respective database 32. In accordance with some embodiments, the database 32 is distributed across plural nodes in each target database system 14. Such a multi-node parallel processing system is referred to as a massively parallel processing (MPP) system. Alternatively, the target system 14 is a single-node system having plural processors (sometimes referred to as a symmetric processing system or SMP).

Each target database system 14 is associated with a system environment 34, which is made up of system-specific information as well as database-level information of each target system. Thus, as used here, "environment information" of a target database system refers to the system-specific information, database-level information, or any portion of the system-specific or database-level information.

System-specific information includes such information as the number of nodes in the target system, the number of processors or central processing units (CPUs) per node, the number of virtual processors in each node, and other system information. Database-level information includes statistics, random samples of virtual processors, data manipulation language (DML) statements, data definition language (DDL) statements, and the actual data of the database itself.

Statistics include information on how data is structured in the database, the number of rows in a table, the data demographics of a table, and approximations of the distributions of particular data values in columns (or attributes) of a table (or relation). Random samples refer to samples captured from virtual processors, which are software modules that manage access of respective portions of a database. The random samples contain the data demographics of the database portions managed by the virtual processors. DDL statements affect the structure of database objects, and may include statements such as SQL (Structured Query Language) ALTER statements (to redefine or alter databases, tables, indexes, etc.), CREATE statements (to create databases, indexes, tables, etc.), and so forth. DML statements are statements that manipulate data, such as the COMMIT statement (to make permanent all changes since the beginning of a transaction), DELETE statement (to remove rows from a table), INSERT statement (to add new rows to a table), SELECT statement (to perform a query by selecting rows and columns from one or more tables), UPDATE statement (to change data in a table), and so forth.

The target database systems 14A, 14B are coupled to a data network 12. The data network 12 may be a private network, or it may be a public network such as the Internet. Communications over the data network 12 can be according to various techniques and protocols.

The emulation client system 20, which contains the system emulation tool 22, is also connected to the data network 12. Various data files 24 stored in the emulation client system 20 contain target-level emulation (TLE) data exported from respective target database systems 14A, 14B. The system emulation tool 22 is able to export TLE data from the target systems 14A, 14B over the data network 12. Once the TLE data is stored in a data file 24 in the emulation client tool 20, the system emulation tool 22 sends the TLE data to the test system 10. This is referred to as importing the TLE data to the test system 10. In one example, the test system 10 is a portable computer, a desktop computer, or any other system in which database management software 16 is executable.

The TLE data exported by the system emulation tool 22 includes environment information, such as cost-related information, statistics, random samples, DDL statements, DML statements, actual database data, and so forth, from the target systems 14. The environment information is then imported to the test system 10, with the environment information maintained as target-level emulation data 40. With the ability to export TLE data from a target database system and to import the TLE data into the test system 10, an accurate test environment (to emulate a target database system 14) can be created in the test system 10 in which various tests are performed.

The test system 10 further includes an optimizer module 18 that selects a query plan from among several possible query plans for a given query that accesses data in a database 17 managed by the database management software 16. For more accurate performance determinations, the optimizer module 18 uses the target-level emulation data 40 that has been imported from the emulation client system 20 to form a test environment in the test system 10 to emulate a desired target system. Running in the emulated environment, the optimizer module 18 identifies and selects the most efficient query plan (or one of the more efficient query plans) for a given query. Based on tests performed in the emulated environment, expected performance of various queries in the target database system can be determined.

For a given query, the optimizer module 18 identifies a query plan that has the lowest, or one of the lowest, response times. The response time is the amount of time it takes to complete the execution of the query on the given target database system. One technique of query optimization uses a cost model to estimate the response time of a given query plan and to search the space of query plans to return a plan with a low cost. In the cost-based optimization model, different methods for doing a unit of work is compared and the most efficient method is selected (the plan with the lowest cost). Because the number of alternatives may be quite large, especially in a parallel database system with a large number of nodes running a large relational database (with many tables), the query optimizer module 18 uses statistics and/or sampling techniques to reduce the search space in optimizing queries.

The test system 10, in accordance with one embodiment, also includes a visual explain and compare module 42 that presents a query plan selected by the optimizer module 18 in a user interface of the test system 10. In one embodiment, the visual explain and compare module 42 provides a graphical user interface in which steps of a query plan are displayed. Each step of the query plan is depicted as an icon, with the icons connected by lines to represent the flow of the steps in the query plan. The icons are designed to represent objects such as relational algebra (e.g., select, project, join); physical algebraic operators such as nested join, merge join, hash join, and so forth; tables; sorts; redistribution; views; duplications; and other objects.

Another feature of the visual explain and compare module 42 is the ability to graphically or visually compare plural query plans for a given query, with the plural query plans generated under different conditions. This provides the user with the ability to analyze differences between different query plans. Query plans of a given query can change in response to differences in various conditions, such as differences in database management systems, differences in platforms on which database management systems are executed, differences in software (e.g., applications, operating systems), different contents of tables, and so forth.

In addition to more accurate performance of the optimizer module 18, target-level emulation also allows systems less sophisticated than the target parallel systems to accurately emulate query plan generation (and associated cost estimates). In fact, many test systems 10 are as simple as portable or notebook computers loaded with the appropriate software and data including the optimizer module 18, the database management software 16, and the database 17. Consequently, by using the target-level emulation feature in accordance with some embodiments, a more convenient, flexible, and cost-effective test method and apparatus is provided in test systems to more accurately test query plan generation of database management software running in target database systems.

Figure 2:
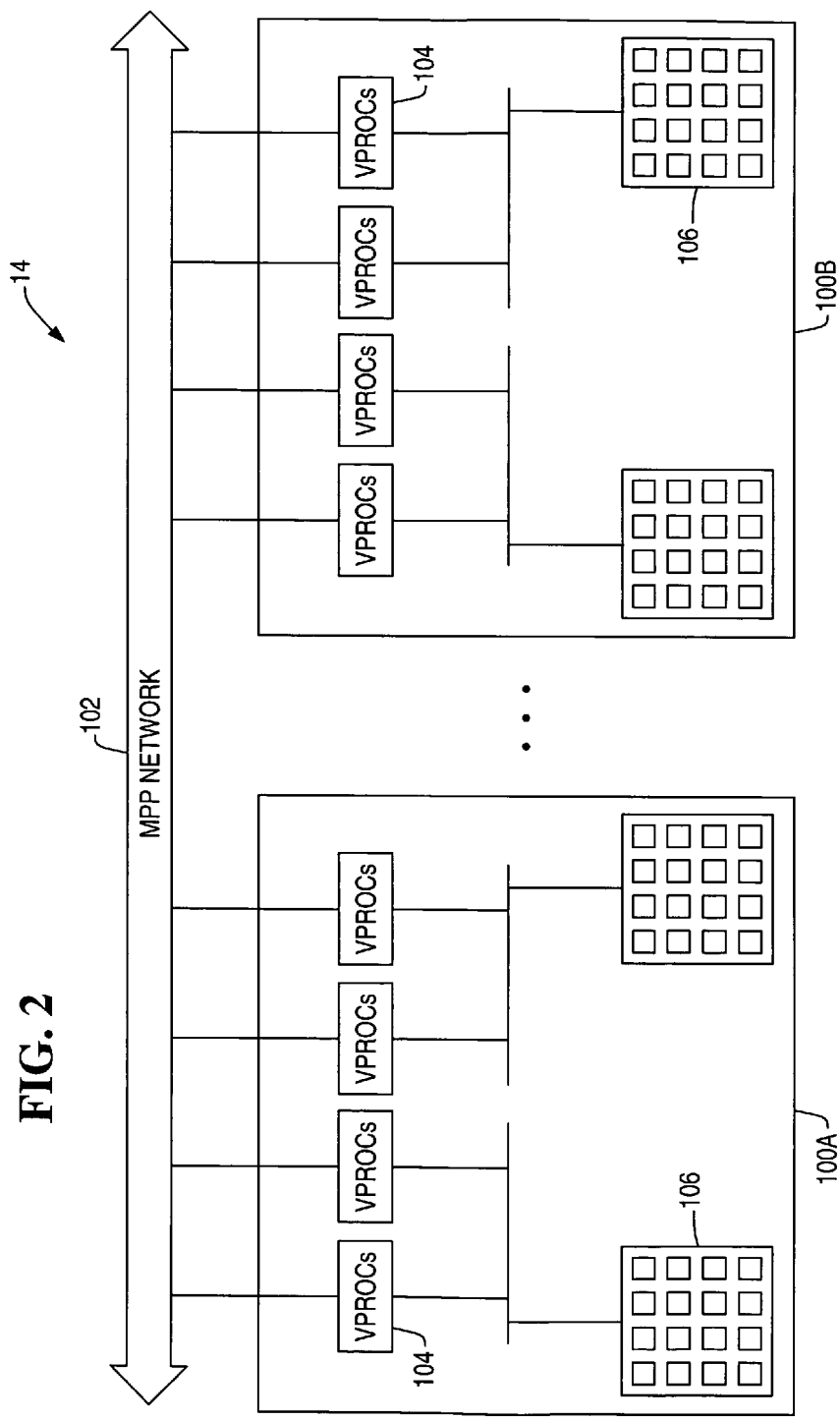
FIG. 2 is a block diagram of an example target system.

FIG. 2 shows an example arrangement of a target multi-node parallel database system 14. The target database system 14 has plural nodes 10A, 100B, and so forth, coupled by an interconnect network 102. Each node may include a single central processing unit (CPU) or multiple CPUs.

In addition, as illustrated in FIG. 2, each node 100 includes multiple virtual processors (VPROCs) 104, which include parsing engines (PEs) and access module processors (AMPs). More than one PE or AMP can run in each node. PEs handle access requests, which are in the form of SQL (Standard Query Language) statements, and generates executable steps that are performed in one or more AMPs. Each AMP is responsible for a logical disk space, referred to as a virtual disk (VDISK), which includes one or more storage devices 106. The concept of VPROCs and VDISKs enable a larger amount of parallelism in the parallel system 14.

In further embodiments, plural VPROCs, such as PEs and AMPs, are also executable in a single-node multiprocessing system, such as an SMP system. In the single-node system, plural VPROCs are distributed across plural CPUs. In another arrangement, plural VPROCs are run on a single-node system having a single CPU. As used here, a "parallel system" refers to a multi-node parallel processing system, a single-node multiprocessing system with multiple CPUs, or a single-node system with a single CPU running multiple virtual processors.

More generally, a database system includes one or more "access modules," which can be implemented in software, hardware, or a combination thereof, to manage access of respective portions of a database.

As described above, the system emulation tool 22 (FIG. 1) in the emulation client system 20 is able to export TLE data from a target database system, and subsequently, to import the TLE data to the test system 10. In accordance with some embodiments, the system emulation tool 22 presents a graphical user interface (GUI) 28 in a display 26 of the emulation client system 20. The GUI 28 is able to display the various windows and screens provided by the system emulation tool 22. The windows and screens allow a user at the emulation client system 20 to select various options associated with the export and import of TLE data.

Figure 3:
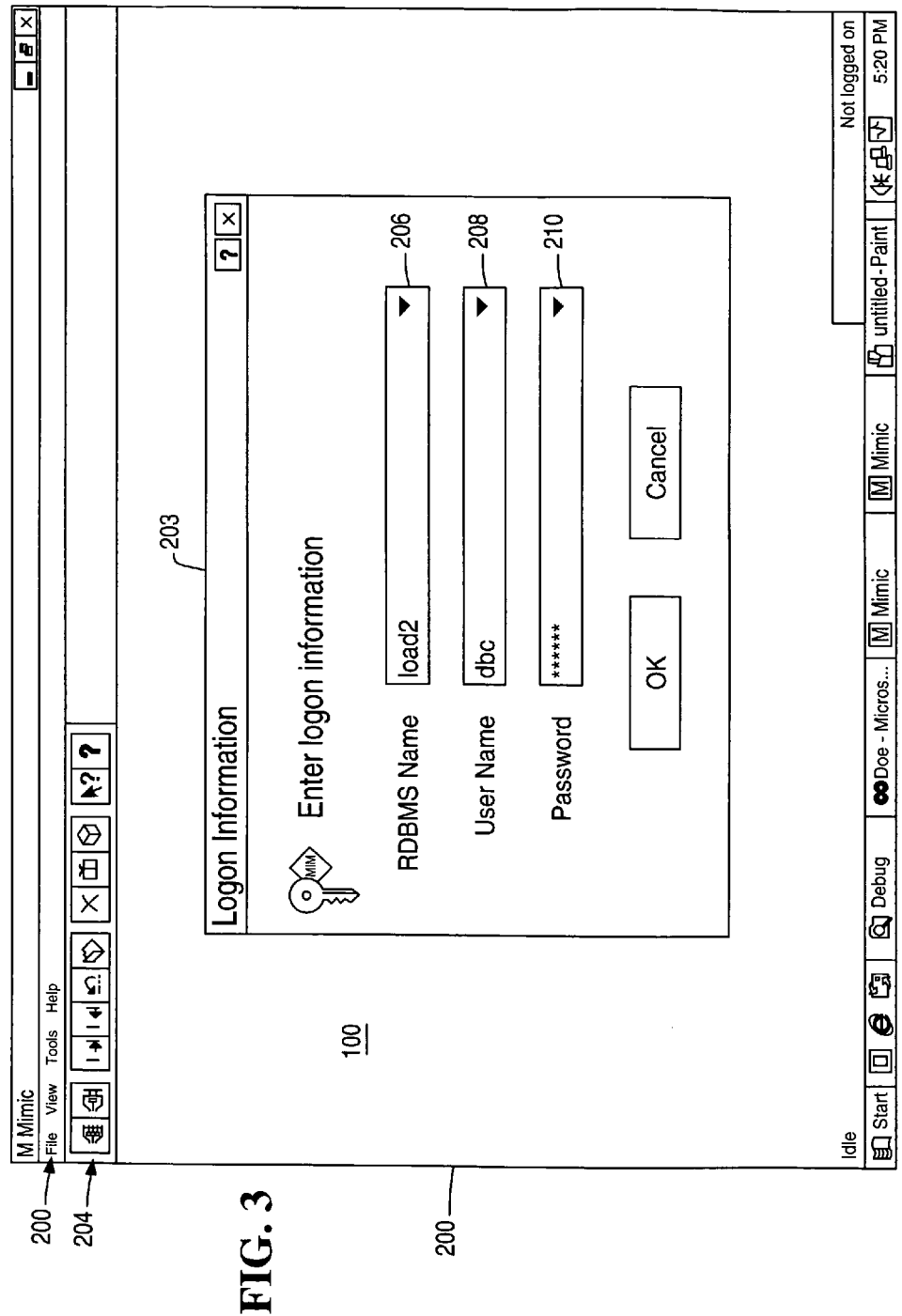
FIG. 3 illustrates a logon screen displayed in a user interface in the emulation client system of FIG. 1.

As shown in FIG. 3, an example window 200 presented by the system emulation tool 22 includes several menu items 202 as well as icons 204 that are selectable by a user to perform various tasks. For example, by selecting a predetermined item in the file menu, a logon screen 203 can be invoked to enable the user to enter information to log on to a target database system 14. A field 206, referred to as an RDBMS Name field, in the screen 203 enables a user to enter the name of the target database system. A User Name field 208 allows the user to enter his or her user name for access to the target database system identified in the RDBMs Name field 206. A Password field 210 enables entry of a password. Once a user is logged on, the user is able to perform either a TLE data export or import task using the interface provided by the system emulation tool 22.

Figure 4:
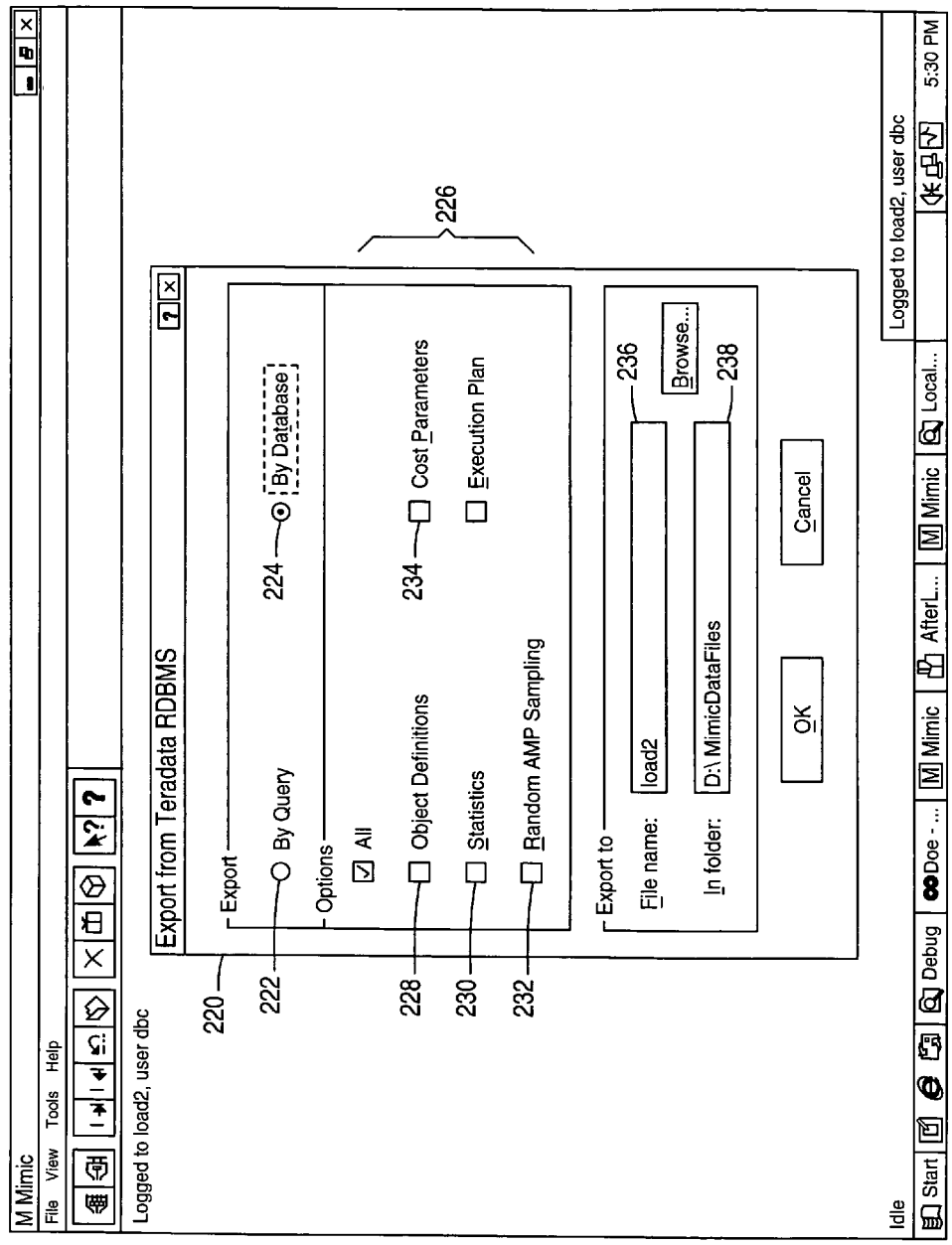
FIGS. 4-12 illustrate screens displayed in the user interface for selecting options associated with exporting environment information for a target database system.

FIG. 4 shows a screen 220 that presents various options selectable by a user in exporting data from a target database system 14. The user can export TLE data either by a given query (by selecting a By Query element 222) or by database (by selecting a By Database element 224). Selection of the By Database element 224 causes environment information of the entire database (including all tables of the database) to be exported. Selection of the By Query element 222 causes only tables referenced by the given query (or queries) to be exported.

The types of environment information to be exported are also selectable by a user. One option is to select all types of environment information. Alternatively, individual types of environment information can be selected, such as by selecting an Object Definitions option 228 (to capture object definitions information including DDL statements that define tables in the target database), a Statistics option 230 (to capture statistics data), a Random AMP Sampling option 232 (to capture random samples of AMPs), and a Cost Parameters option 234 (to capture cost-related information).

For each table in the target database, the object definitions information includes SQL CREATE statements (issued to create tables), SQL ALTER statements (issued to redefine or alter the table), other data definition language (DDL) statements, or other object definitions. One example of a mechanism for extracting object definitions is described in U.S. patent application Ser. No. 09/892,837, entitled "Copying a Portion of a Database Structure Associated with a Query," filed Jun. 27, 2001. However, other mechanisms can be used in other embodiments.

Random AMP samples refer to random samples of virtual processors (in this example AMPs) that capture the data demographics of data stored in storage modules managed by the respective AMPs. Example types of information included in the random AMP samples include a system name, a database name, a table name, time stamp, number of rows in the table, number of indexes on the table, minimum and maximum row lengths, and so forth.

Cost-related information includes the following types of information in one example: number of nodes, number of CPUs per node, number of AMPs per node, amount of memory per AMP, MIPS (millions of instructions per second) for each CPU, disk access speeds, network access speeds, and other system specific information.

Figure 8:
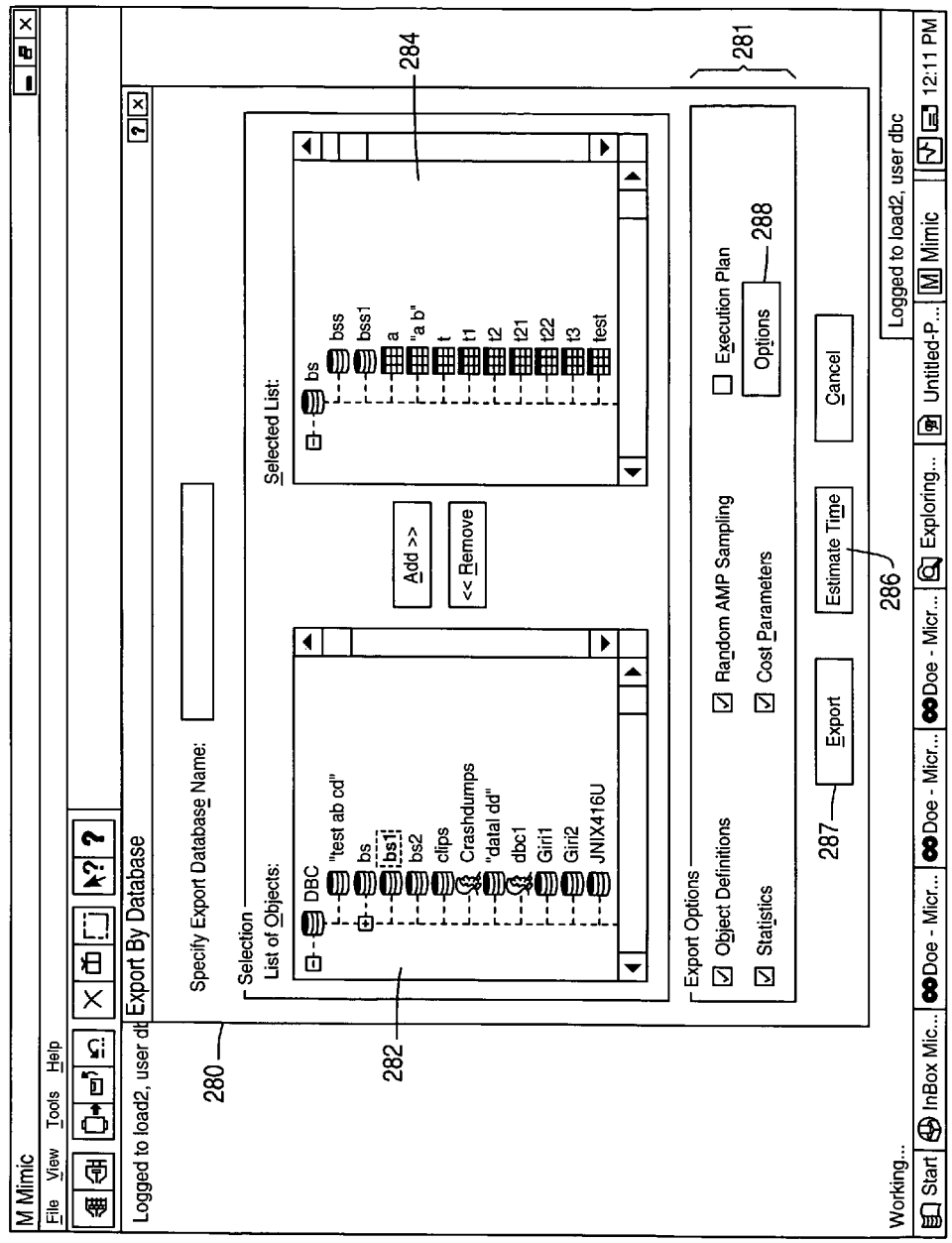

The file name into which the exported data is to be stored is specified in a field 236 in the screen 220 in FIG. 4, and a directory in which the file is located is specified in a field 238. Selection of the By Database element 224 causes an Export By Database screen 280 to be displayed (FIG. 8). Selection of the By Query element 222 causes an Export By Query screen 240 to be displayed (FIG. 5).

Figure 5:
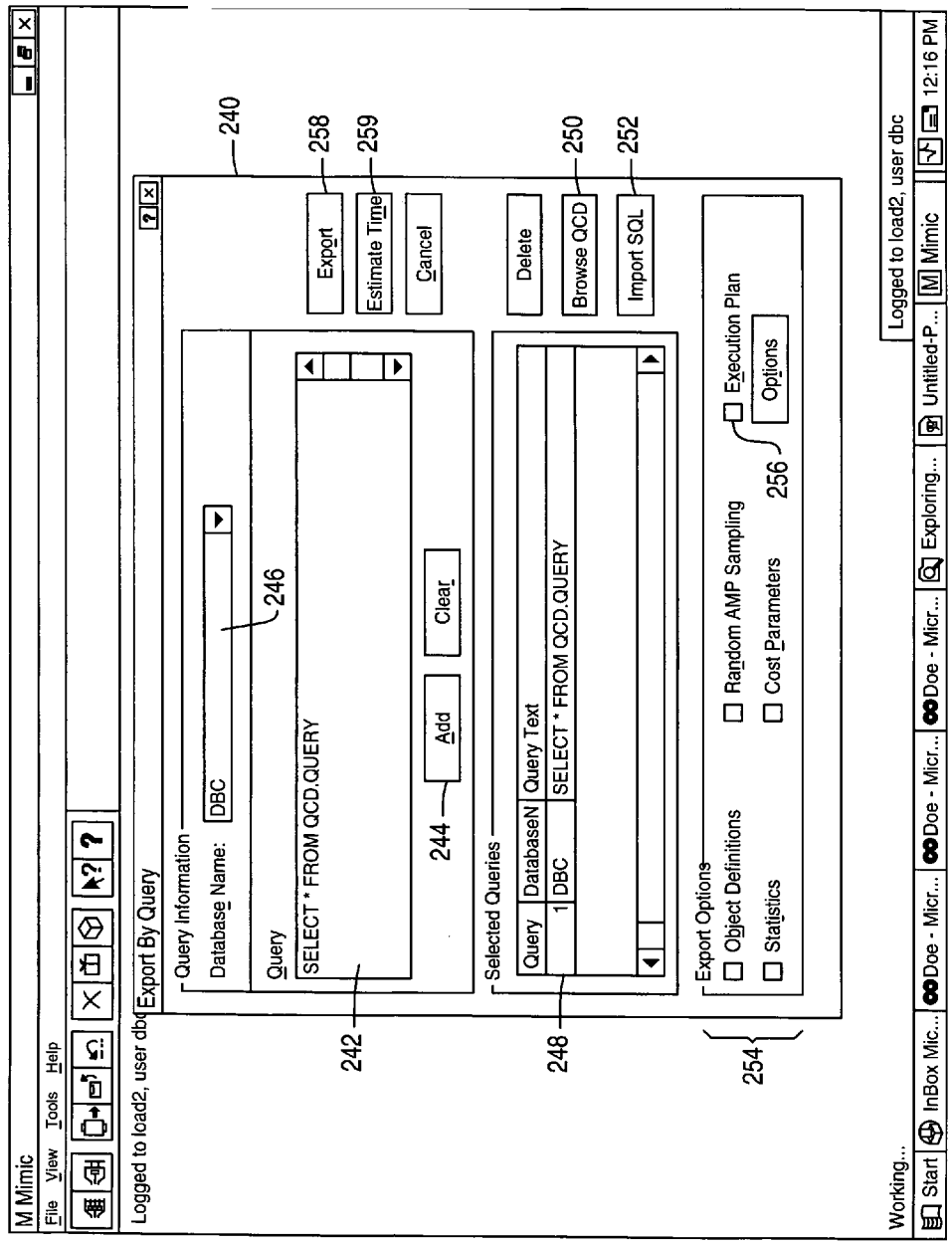

As shown in FIG. 5, the Export By Query screen, 240 contains an entry box 242 in which the query text is entered by the user in the screen 240. Multiple queries can be entered into the box 242 by using an Add button 244. Also, the database name is provided in a Database Name field 246.

Selected queries are shown in a display box 248. The screen 240 also provides other mechanisms for entering queries. A Browse QCD button 250, when activated, allows queries from a query capture database (QCD) to be selected. The QCD contains a query list, which is basically a list of queries. Alternatively, by activating an Import SQL button 252, files containing SQL text can be selected to enter queries.

The Export By Query screen 240 also includes various user-selectable export options 254, which are similar to the export options 226 in FIG. 4. Note that one option that is not selectable in the screen 220 of FIG. 4 is an Execution Plan option 256 (shown as been grayed). When selected, the Execution Plan option 256 causes execution plans (or query plans) associated with selected queries to be exported with the TLE data. According to one embodiment, the execution plan is a series of linear/parallel steps of statements and not generated code. The exported execution plans are generated by the optimizer in the target database system for each given query.

The Export By Query screen 240 also includes an Estimate Time button 259. When the Estimate Time button 259 is activated, a time value is displayed to indicate an estimated amount of time for the export operation. To export TLE data for the selected queries, the user activates an Export button 258.

Figure 6:
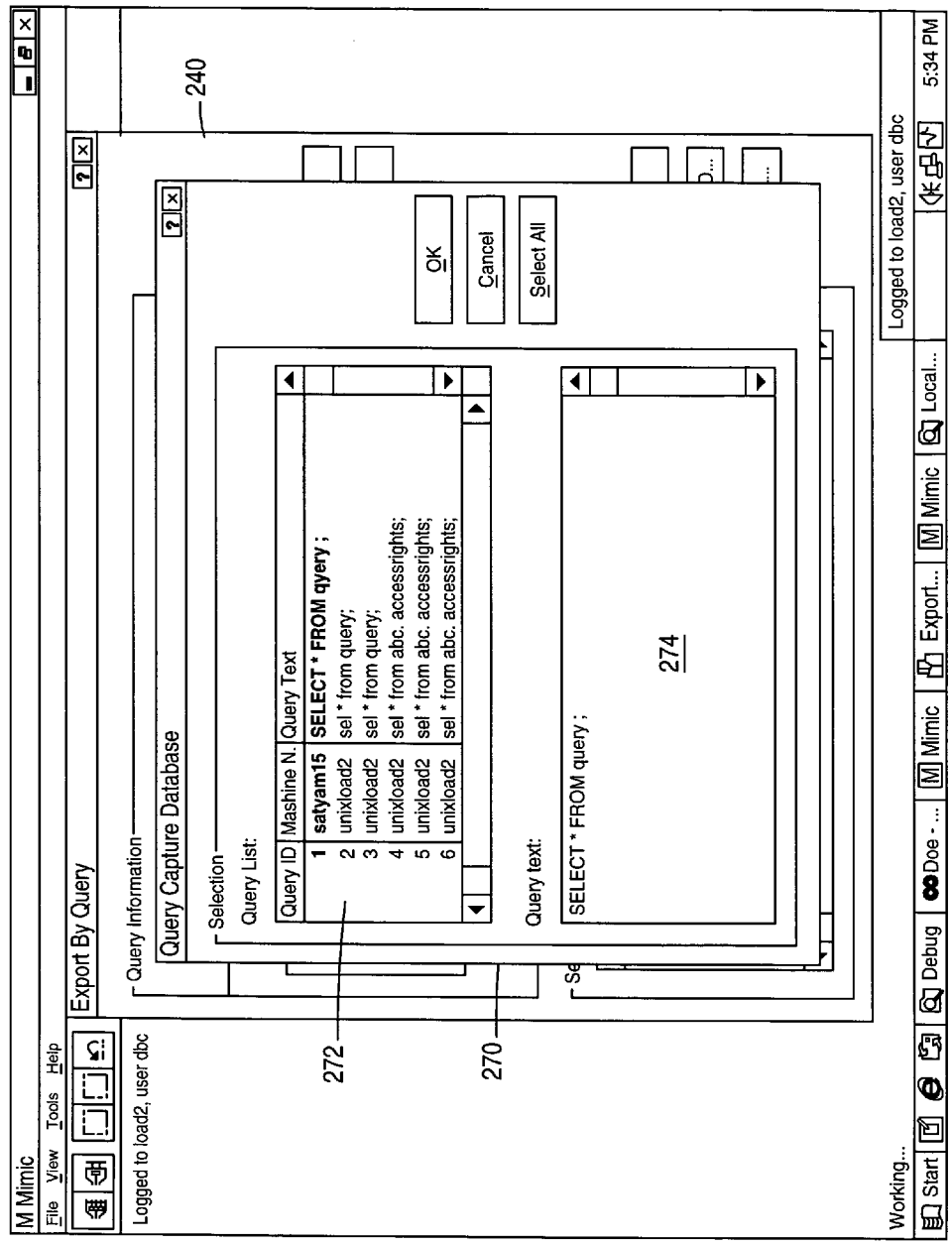

Selection of the Browse QCD button 250 in the Export By Query screen 240 causes a Query Capture Database screen 270 (FIG. 6) to be displayed. On the other hand, selection of the Import SQL button 252 causes an Open screen 260 (FIG. 7) to be displayed. As shown in FIG. 6, the Query Capture Database screen 270 includes a selection box 272 that displays the query list contained in the QCD. The query list contains the query text of plural queries along with the associated query identifiers. Selected query statements are displayed in a Query Text display box 274.

Figure 7:
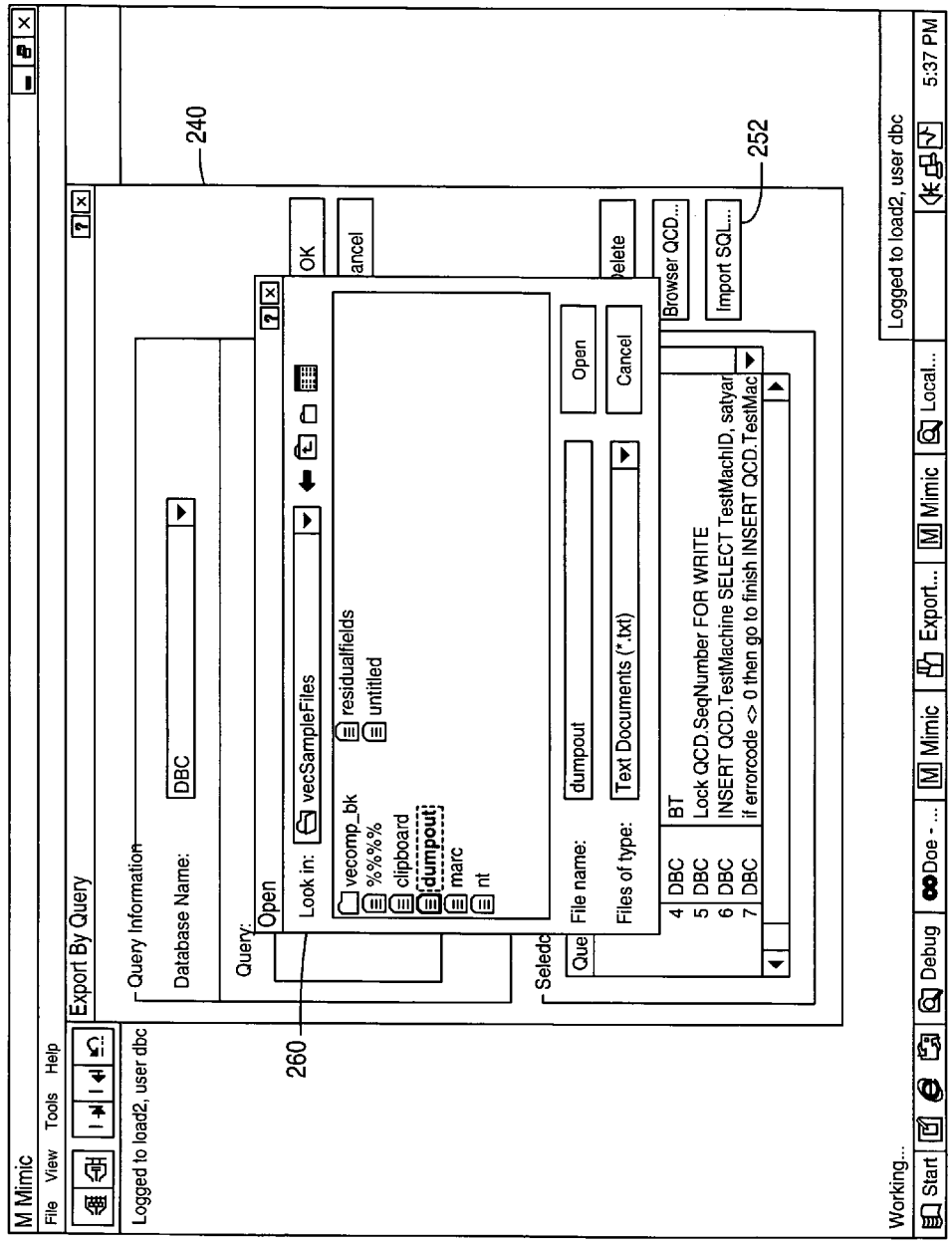

As shown in FIG. 7, the Open screen 260 (displayed in response to selection of the Import SQL button 252) displays files that contain queries. The user can select one of the files, with queries in the selected file imported into the Export By Query screen 240 in FIG. 5.

FIG. 8 shows the Export By Database screen 280 that is displayed when the user selects the By Database element 224 in FIG. 4. In FIG. 8, the user can select one or more objects (tables or databases) for which TLE data is to be exported. A list of objects that can be selected is shown in a selection box 282, and the selected objects are shown in a display box 284.

The types of TLE data to be exported are selected by clicking on one or more of export options 281. In addition, the Export By Database screen 280 contains an Estimate Time button 286 that when selected causes a time value to be displayed to indicate how much time is needed for the export operation. An Export button 287 when activated causes the export operation to proceed. Further, an Options button 288 provides further export options that are selectable by a user.

If the Options button 288 is selected, then an Export Options screen 300 (shown in FIG. 9) is displayed. The Export Options screen 300 includes a user-selectable element 302 associated with exporting statistics data, user-selectable elements 304 associated with exporting random AMP samples (RAS) data, and user-selectable elements 306 associated with exporting cost parameters. A RAS Tag field 308 allows the entry of the name by which RAS data is stored in the target database system. A Cost Tag field 310 allows the entry of the name by which optimizer cost parameters are stored in the target database system.

Figure 10:
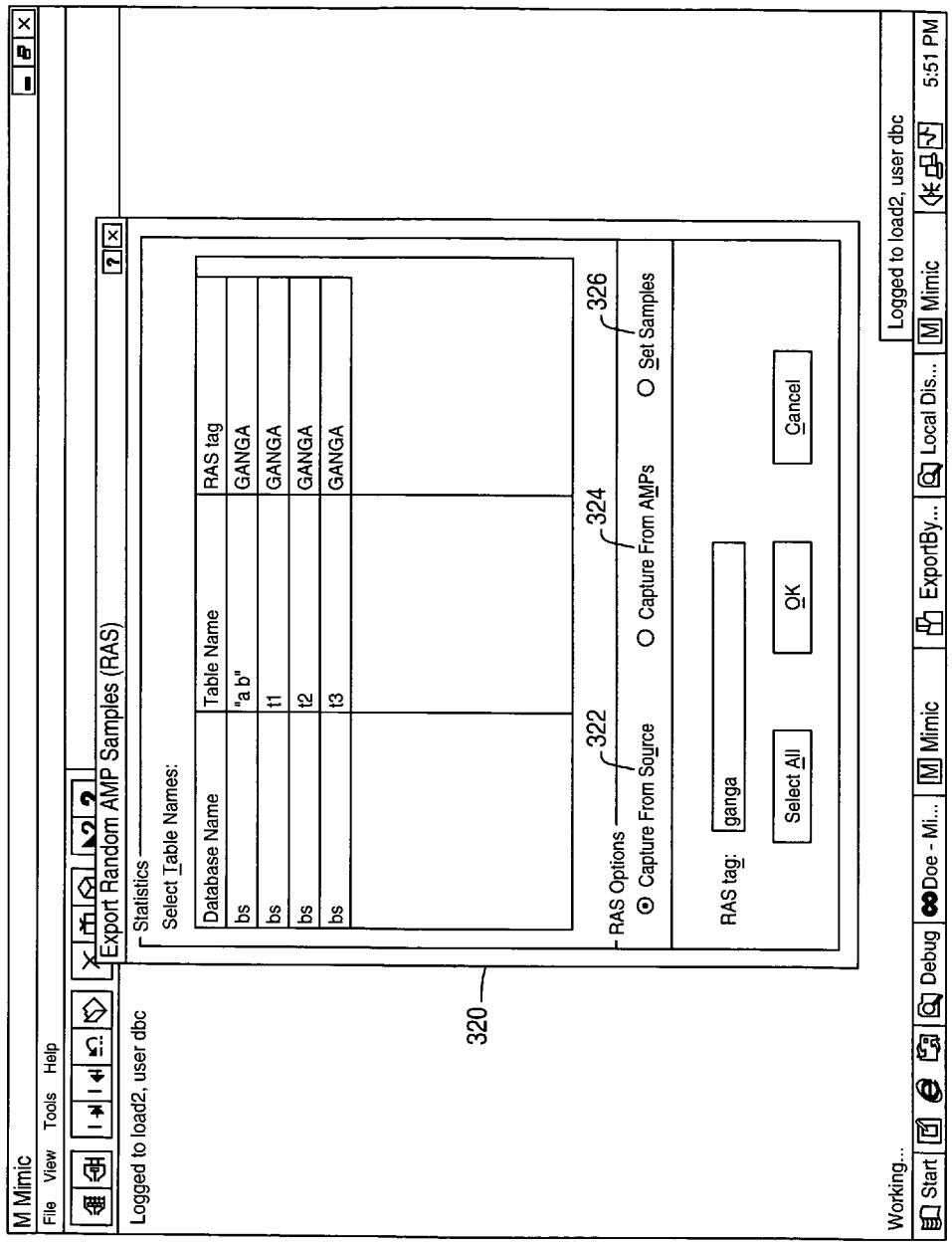

FIG. 10 shows an Export Random AMP samples (RAS) screen 320 that is displayed in response to activation of a Select Tables button 309 in the screen 300. The screen 320 lists tables that can be selected. RAS data is exported for the selected tables.

Three RAS options are selectable. A Capture From Source option 322 when selected causes random AMP samples to be exported from a RAS table (containing captured samples) in the target database system. A Capture From AMPs option 324 when selected causes samples to be captured directly from the AMPs in the target database system, rather than from the RAS table. Another option, a Set Samples option 326, causes samples to be set (by the user) in the target database system, which are then exported.

Figure 9:
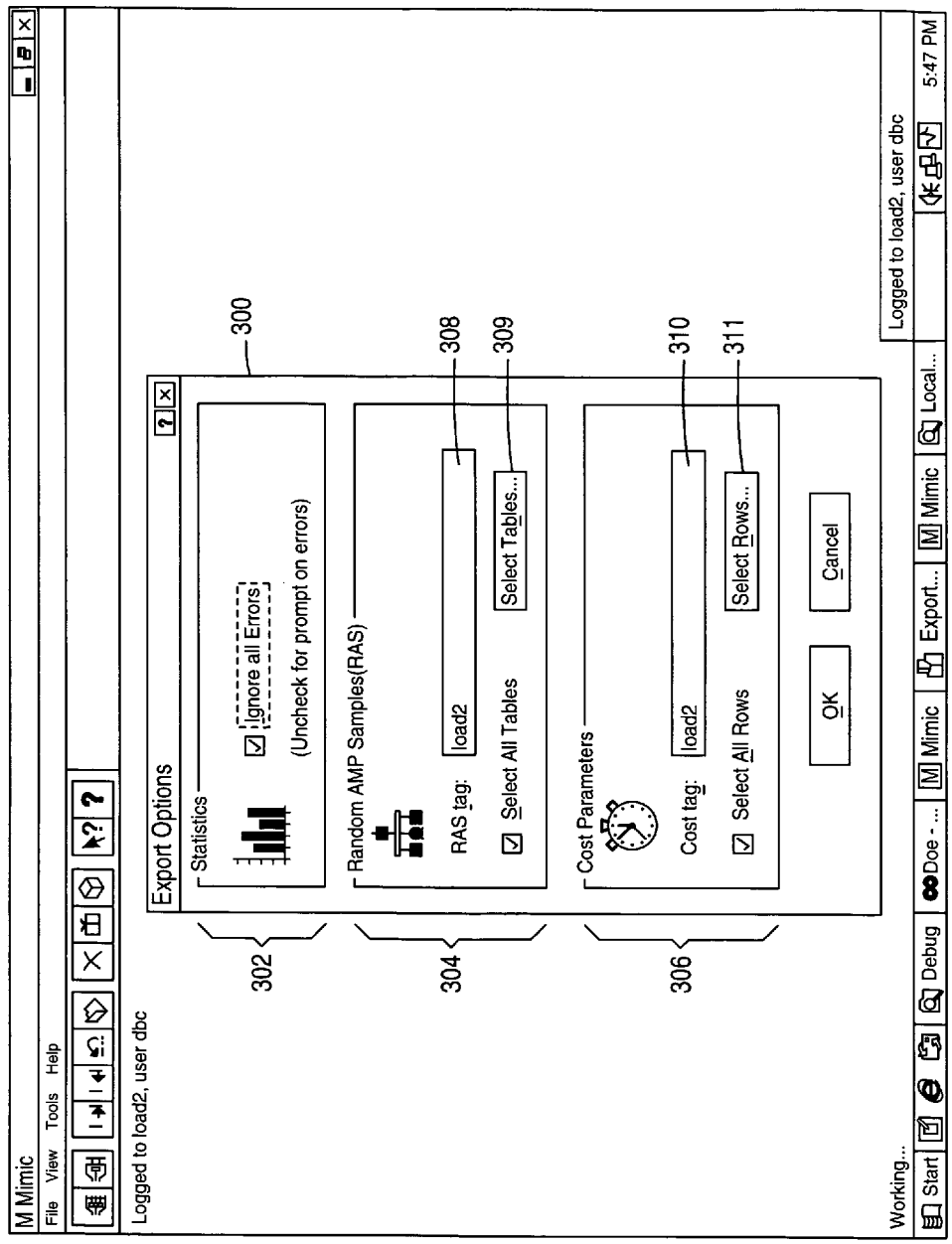
Figure 11:
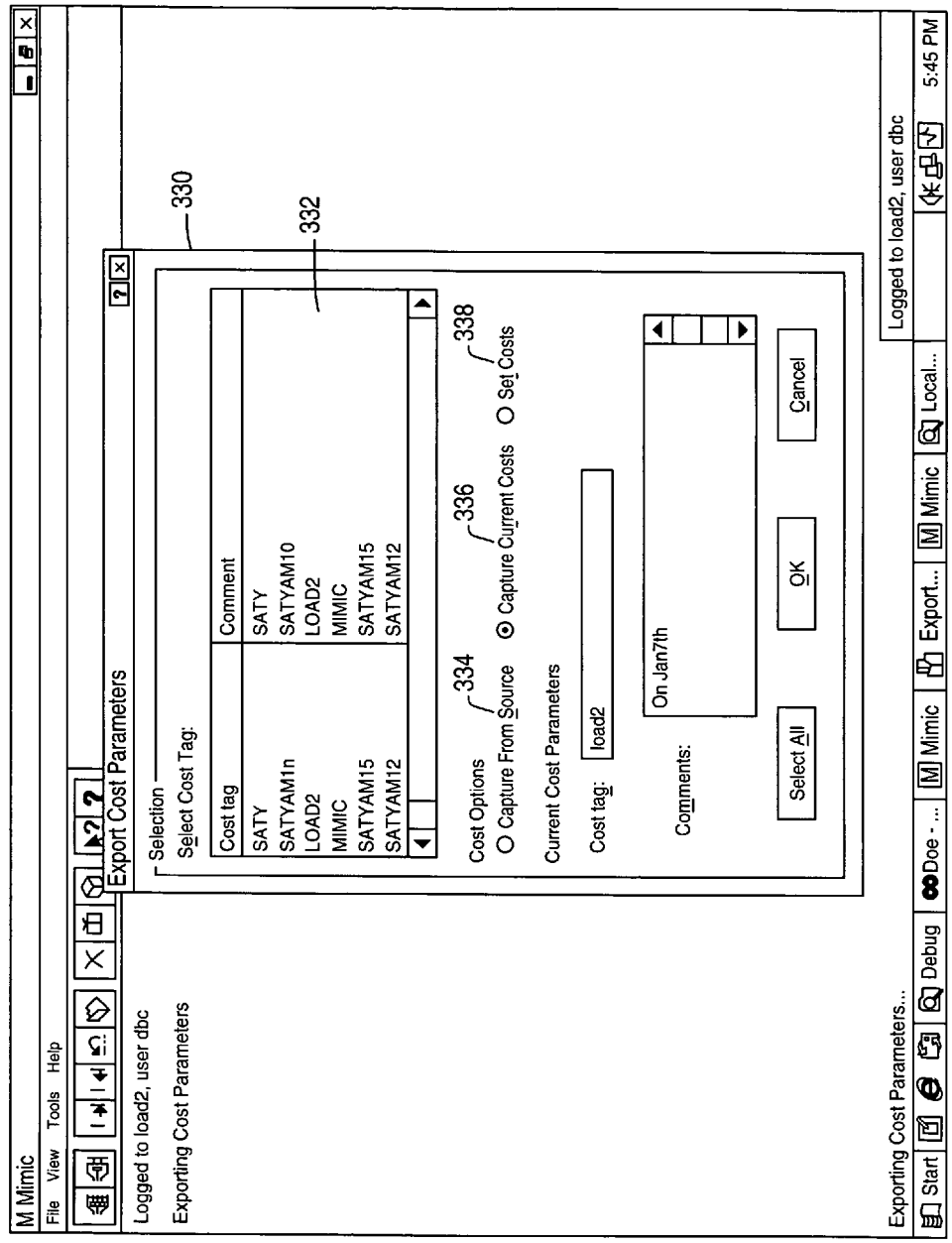

FIG. 11 shows an Export Cost Parameters screen 330 that is displayed in response to activation of a Select Rows button 311 in the Export Options screen (FIG. 9). A selection box 332 lists rows of a cost table that contain cost parameters. Each row contains cost parameters associated with different target database systems. Thus, for example, a customer may have multiple database systems (e.g., one for testing and one for production). The selected row in the selection box 332 selects the cost parameters to export for a desired target database system.

The Export Cost Parameters screen 330 contains a Capture From Source option 334, a Capture Current Costs option 336, and a Set Costs option 338. The Capture From Source option 334 when selected causes cost parameters to be exported directly from the cost table in the target database system. The Capture From AMPs option 336 when selected causes cost parameters to be captured directly from the AMPs in the target database system, rather than from the cost table. The Set Samples option 338 when selected causes cost parameters to be set (by the user) in the target database system, which are then exported.

Figure 12:
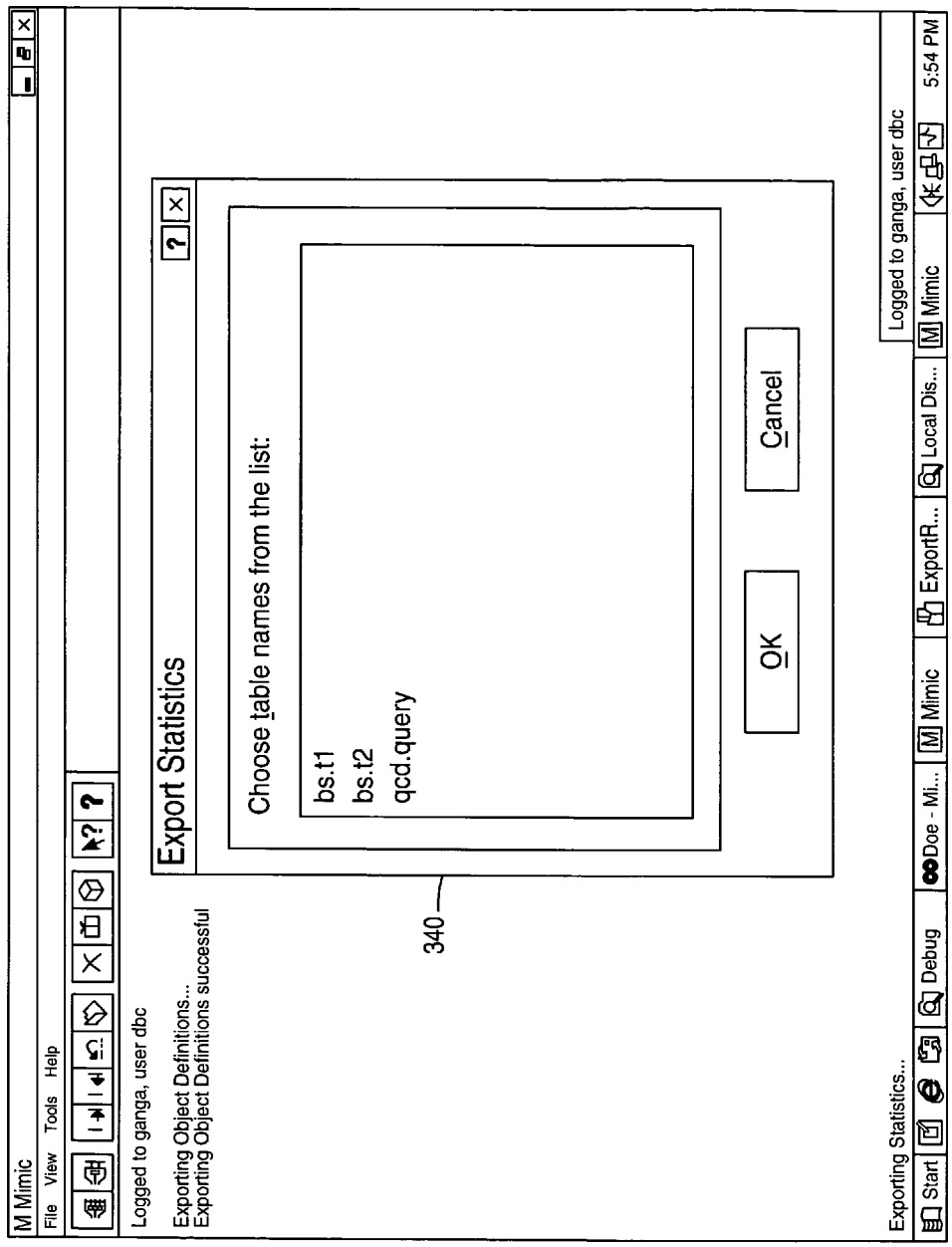

FIG. 12 shows an Export Statistics screen 340 that displays a list of tables names. A user can select one or more of the listed tables for which statistics data is to be exported.

Figure 13:
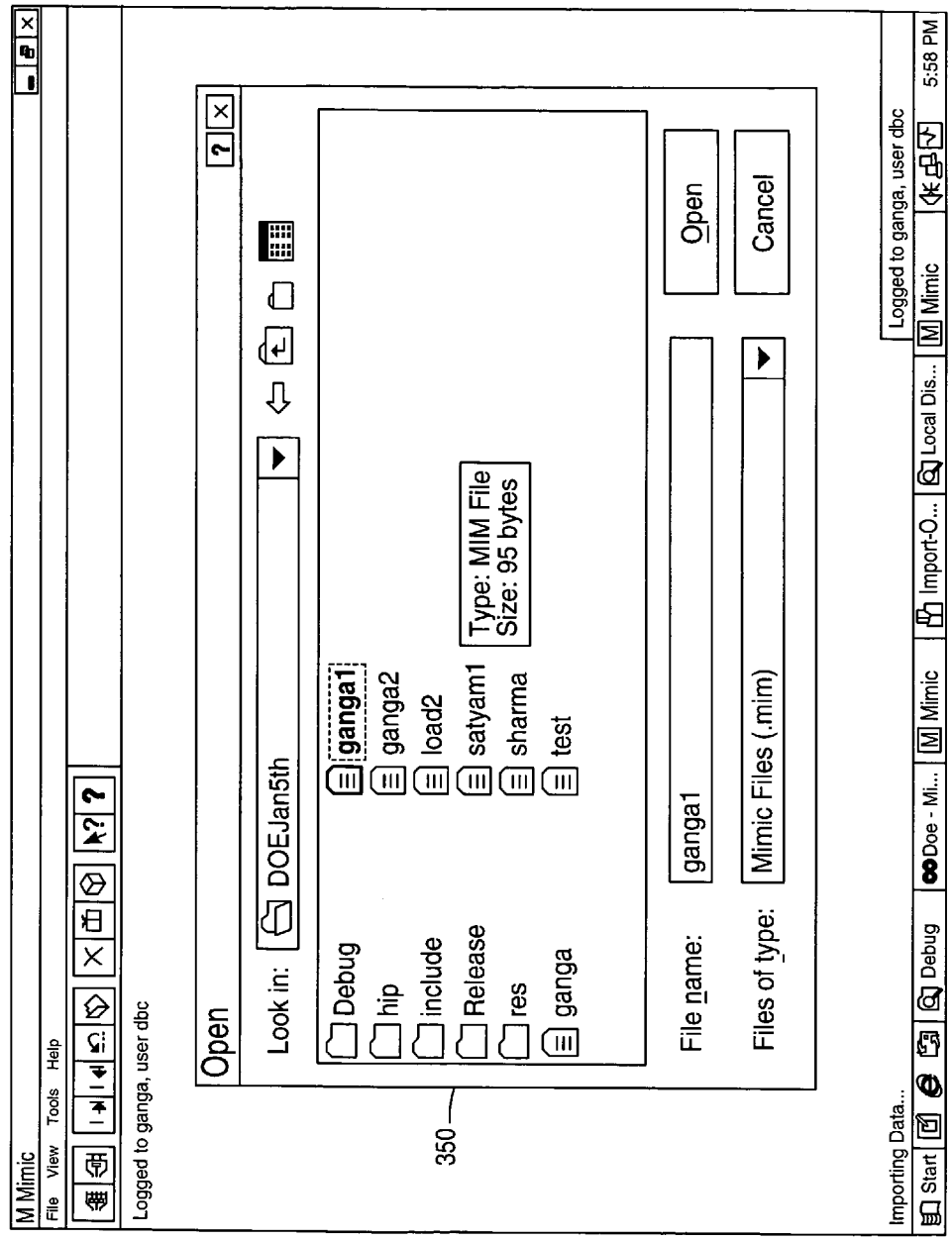
FIGS. 13-17 illustrate screens displayed in the user interface for selecting options associated with importing environment information to a test system.
Figure 14:
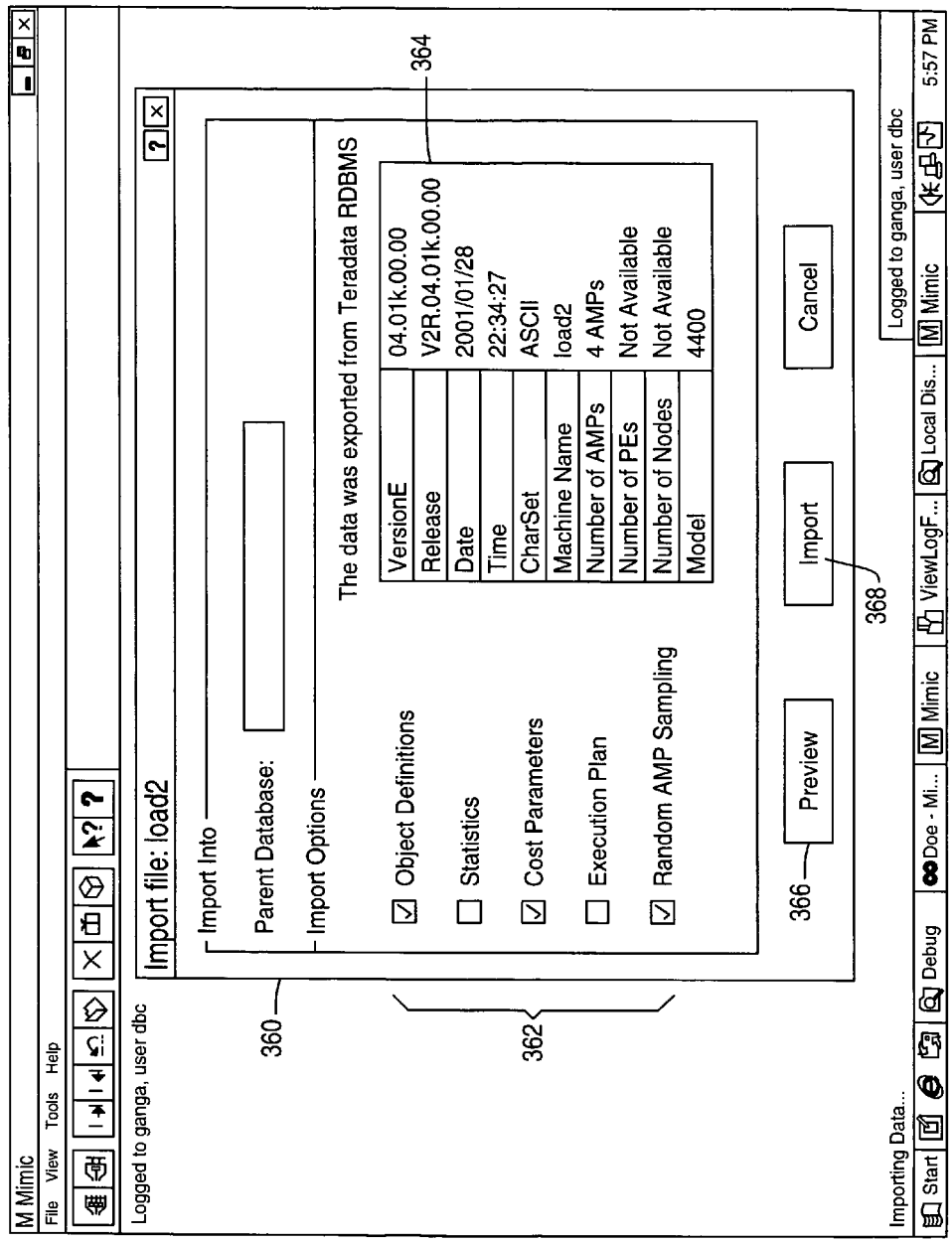

TLE data exported from various target database systems are stored in respective data files. Once exported and saved, the data file can later be opened by selecting a command in the file menu to cause an Open screen 350 (FIG. 13) to be displayed. A list of data files is displayed in the screen 350, with one of the data files selected by a user to open. Once a file is selected for opening, a screen 360 is displayed (as shown in FIG. 14) that shows import options 362 selectable by a user. The types of TLE data to import to the test system 10 are selected using the import options 362. The options 362 are the same options (Object Definitions option, Statistics option, Cost Parameters option, and Random AMP Samples option) that are selectable in the export screens described above. Information pertaining to the source of the TLE data is displayed in a display box 364.

Figure 15:
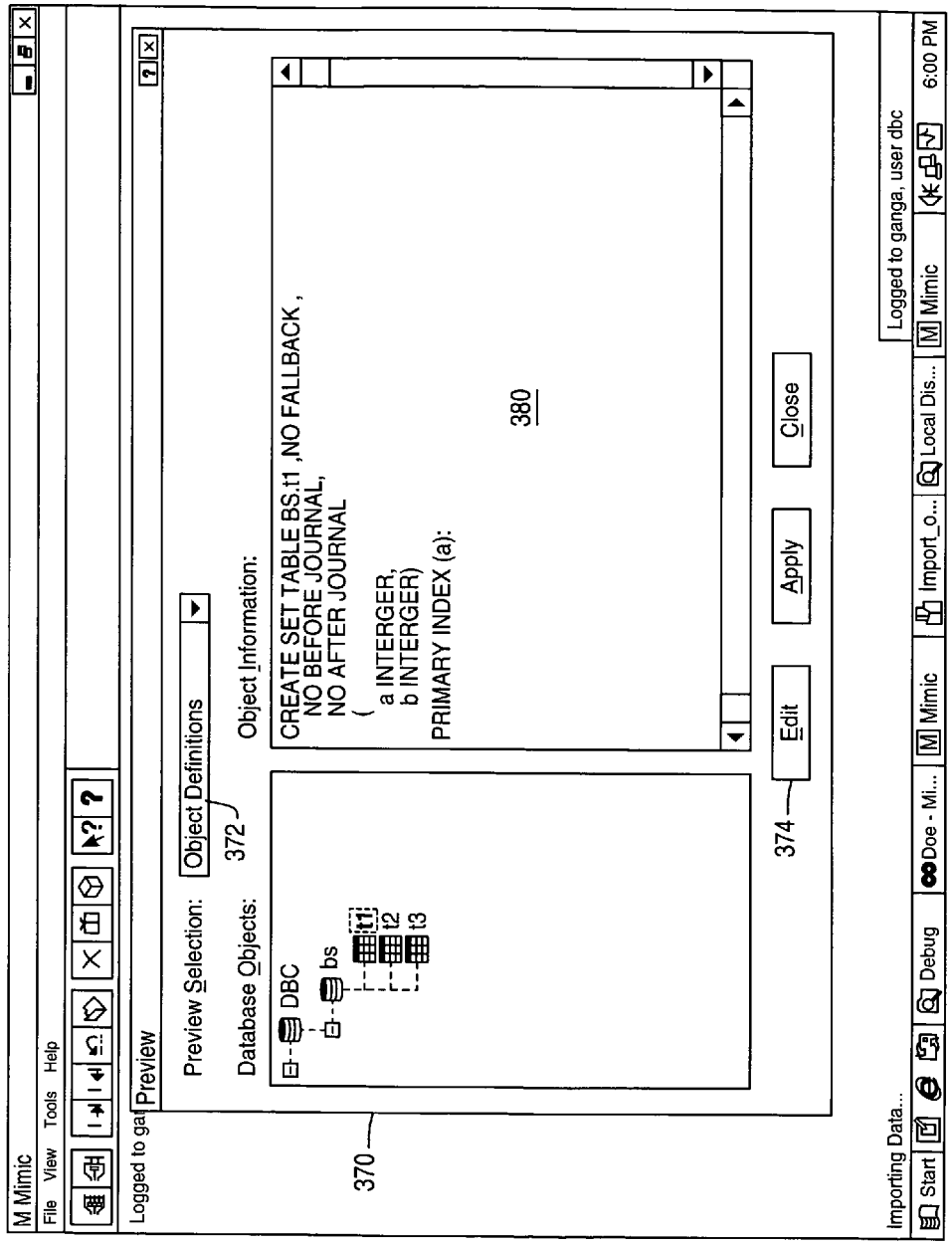
Figure 16:
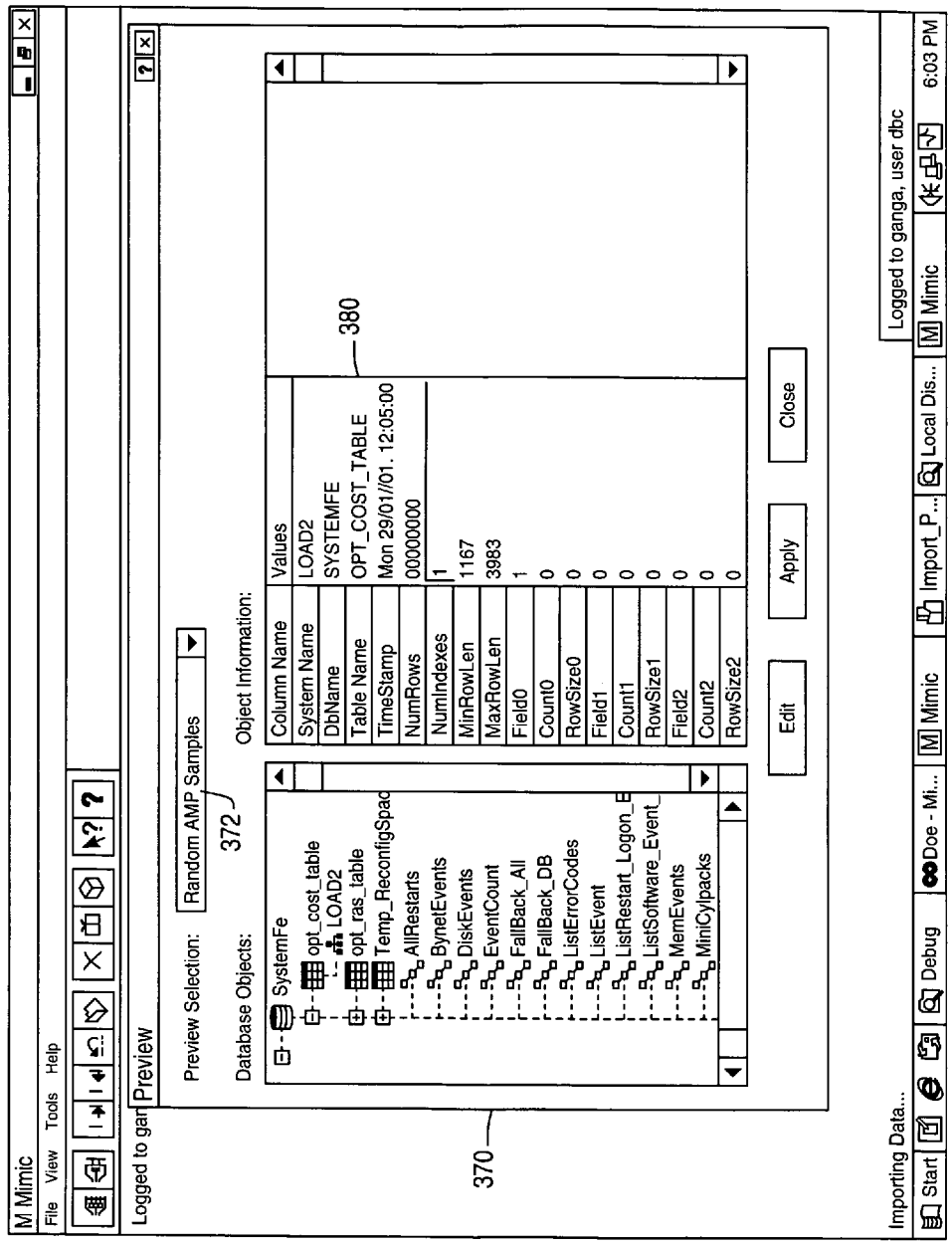

The screen 360 also includes various buttons, including a Preview button 366 and an Import button 368. If the Preview button 366 is selected, then a Preview screen 370 is displayed (FIG. 15) in which the TLE data to be imported to the test system 10 can be previewed by a user. The Preview screen 360 includes a Preview Selection field 372 that enables a user to select the type of information to preview, including object definitions data, statistics data, and random AMP samples data. In the example of FIG. 15, the Object Definitions option in the Preview Selection field 372 is selected. The object definitions data is displayed in a display box 380. Note that in the example of the object definitions data includes a CREATE statement. The previewed information can be edited by activating an Edit button 374. Thus, in the example of FIG. 15, the CREATE statement displayed in the box 380 can be modified by the user. If selected for preview, other types of TLE data can be similarly edited.

If the Random AMP Samples option in the Preview Selection field 372 is selected, the Preview screen 370 displays random AMP samples data for various tables in a database (e.g., SHRITY). Again, if the Edit button 374 is activated, the random AMP samples data can be modified by the user.

Figure 17:
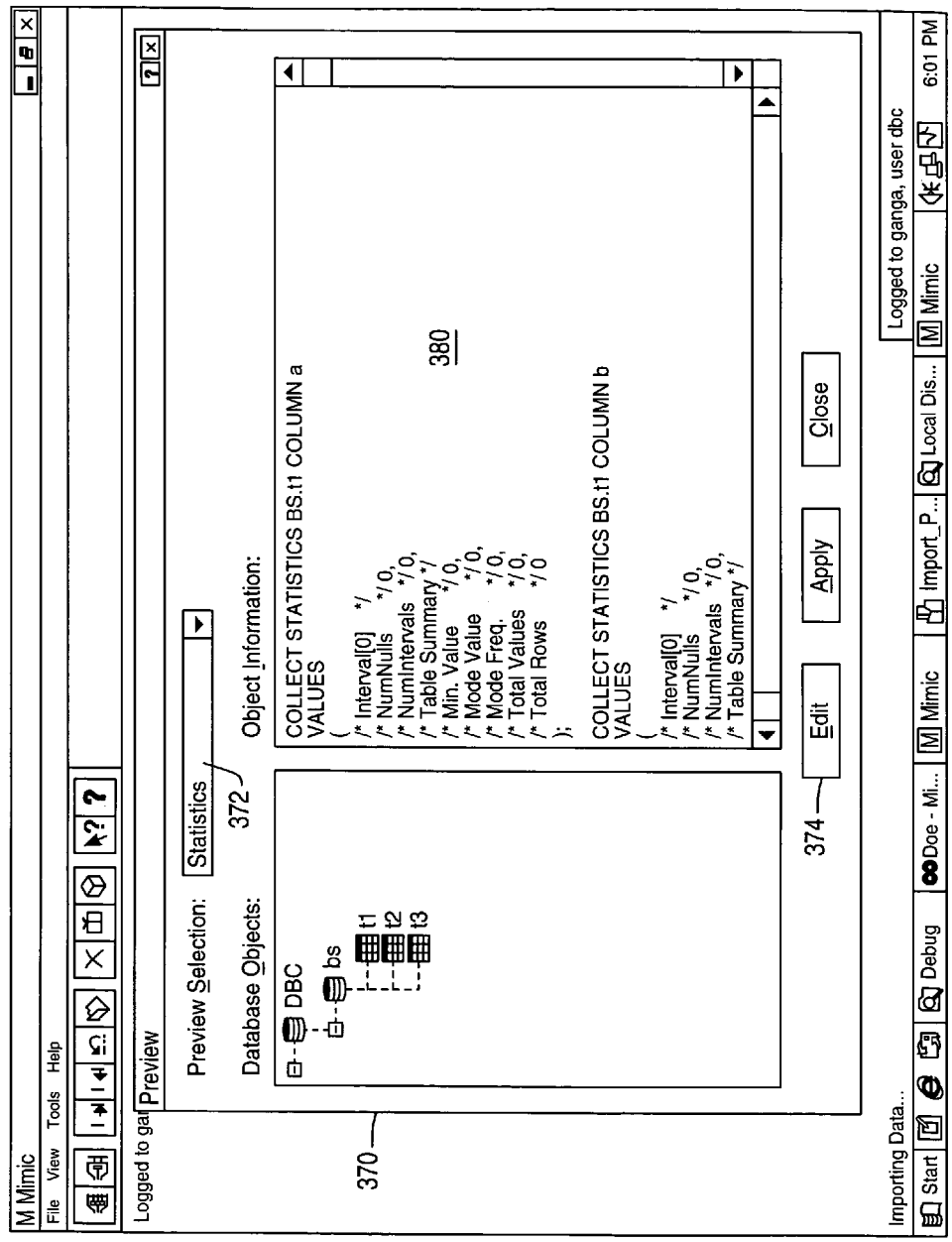

In FIG. 17, the Preview screen 370 shows the table-level statistics data for table Ti in the display box 380, in response to the Statistics option in the Preview Selection field 372 being selected. In addition to, or as an alternative to, the table-level statistics, the Preview screen 370 can also show detail interval-level statistics for the table and column. Again, the information in display box 380 can be edited if the Edit button 374 is activated.

Figure 18:
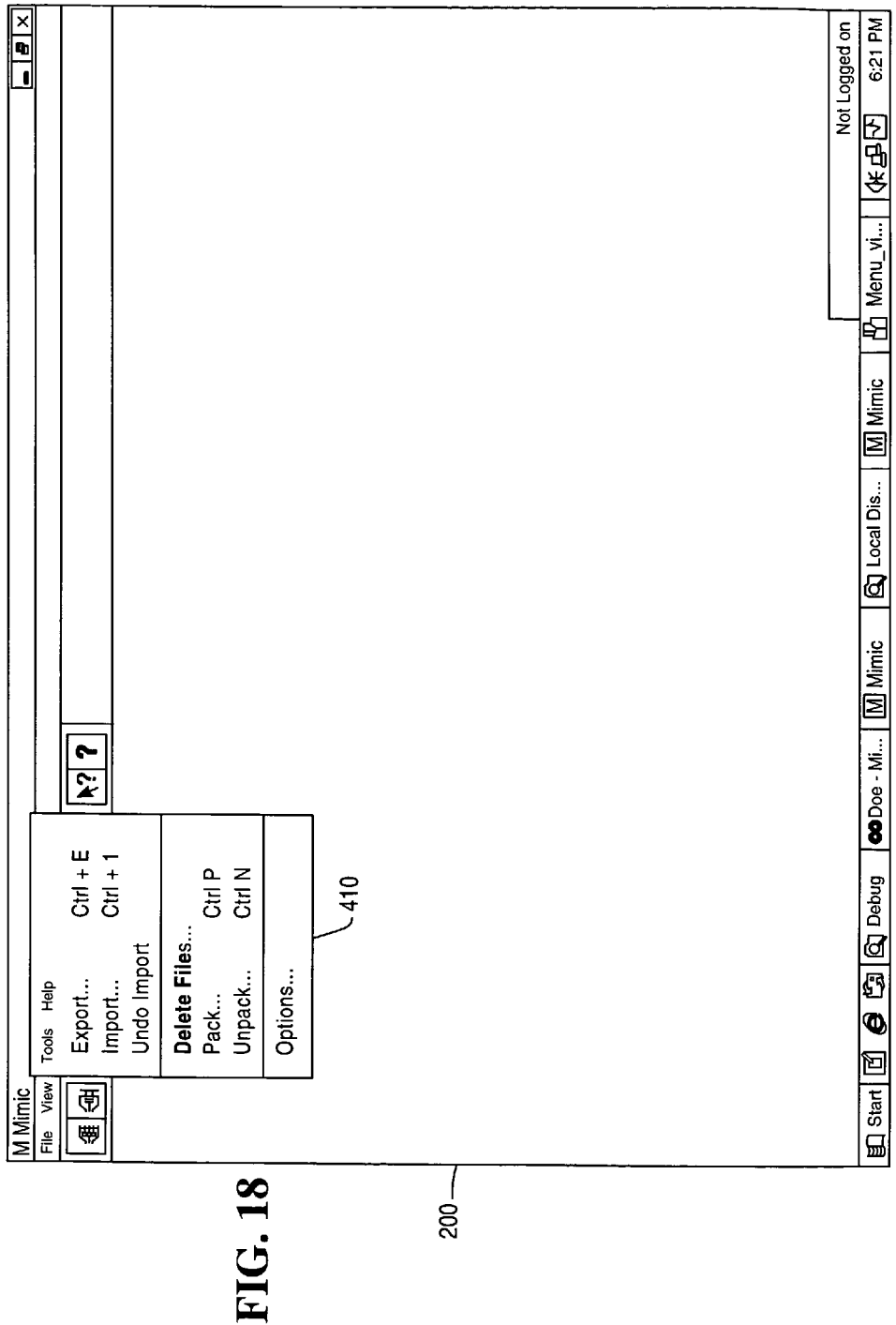
FIGS. 18-21 illustrate screens displayed in the user interface for performing other tasks.
Figure 19:
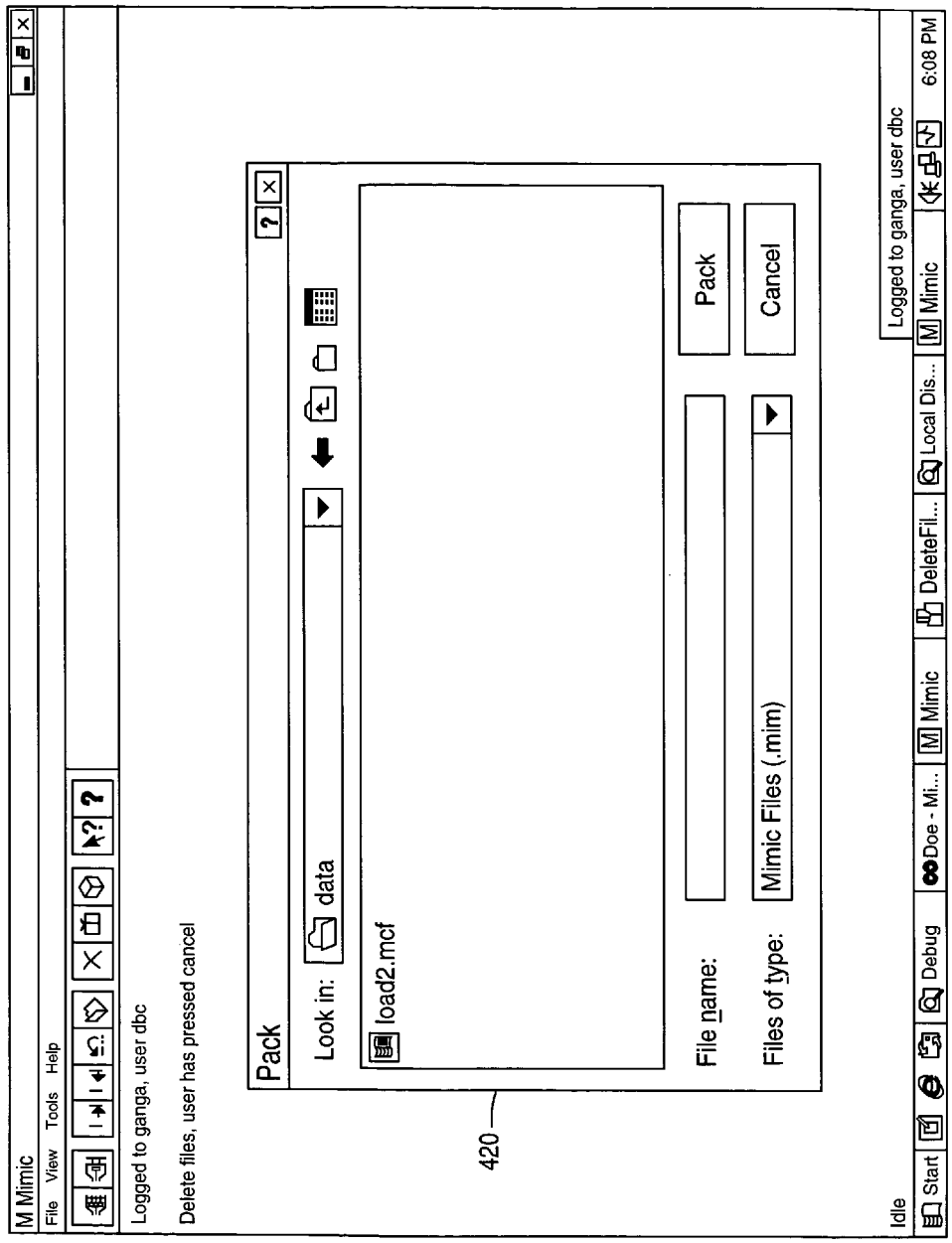

FIG. 18 shows the various commands available under the Tools menu item 410 of the window 200 presented by the systems emulation tool 22. The Tools menu 410 includes the following items: Export (to export TLE data from a source system), Import (to import data into a test system), and Undo Import (to undo a previous import action). Another item in the Tools menu 410 is the Pack item. Selection of the Pack item enables multiple data files (containing exported TLE data) to be packed into one file. Thus, as shown in FIG. 19 in a Pack screen 420, multiple files can be selected and packed into one file (referred to as a .pac file).

Figure 20:
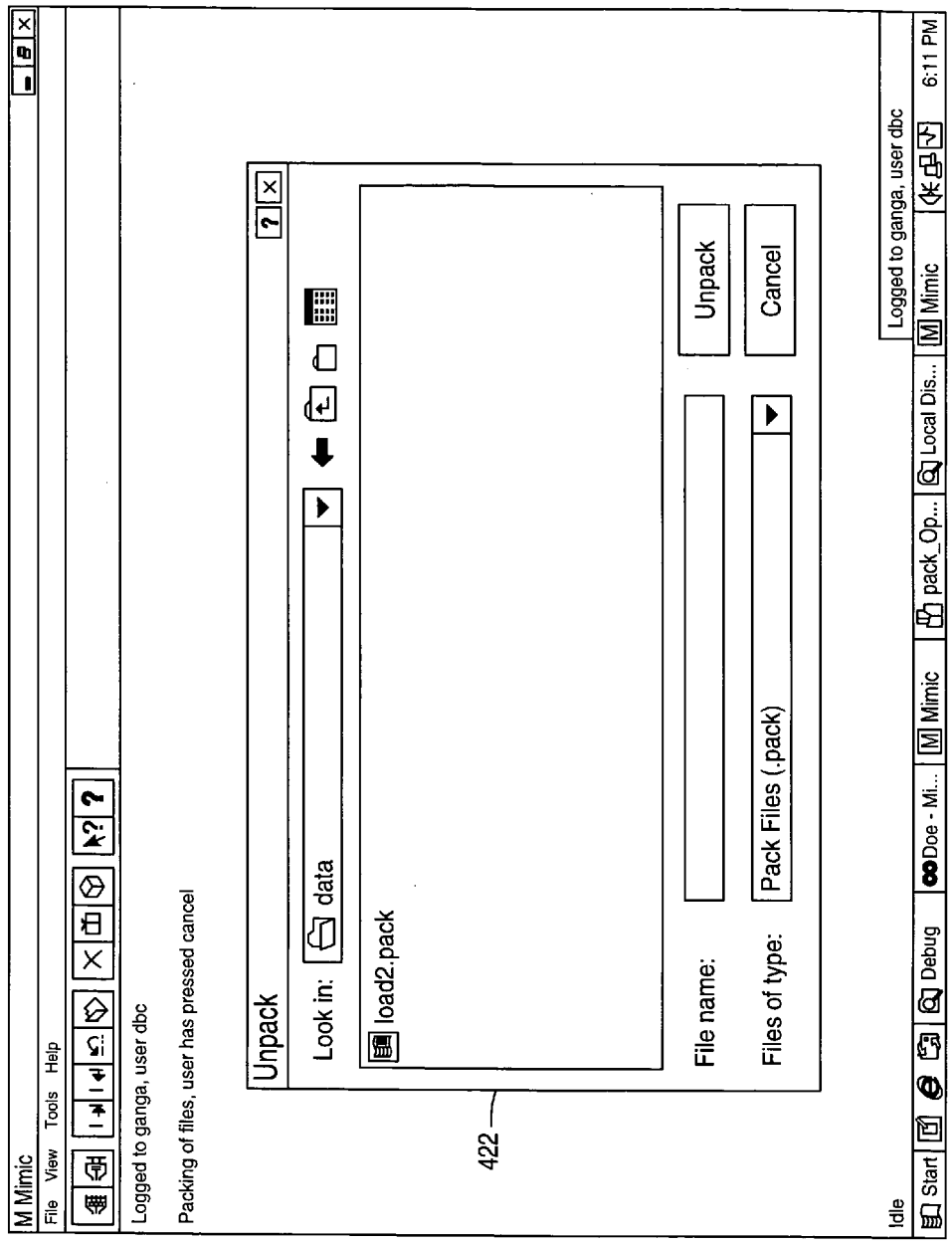

To undo a pack operation, the Unpack item in the Tool menu 410 can be selected (FIG. 20) in an Unpack screen 422 to unpack a pack file (.pac file). This causes the .pac file to be broken up into its original data files.

Figure 21:
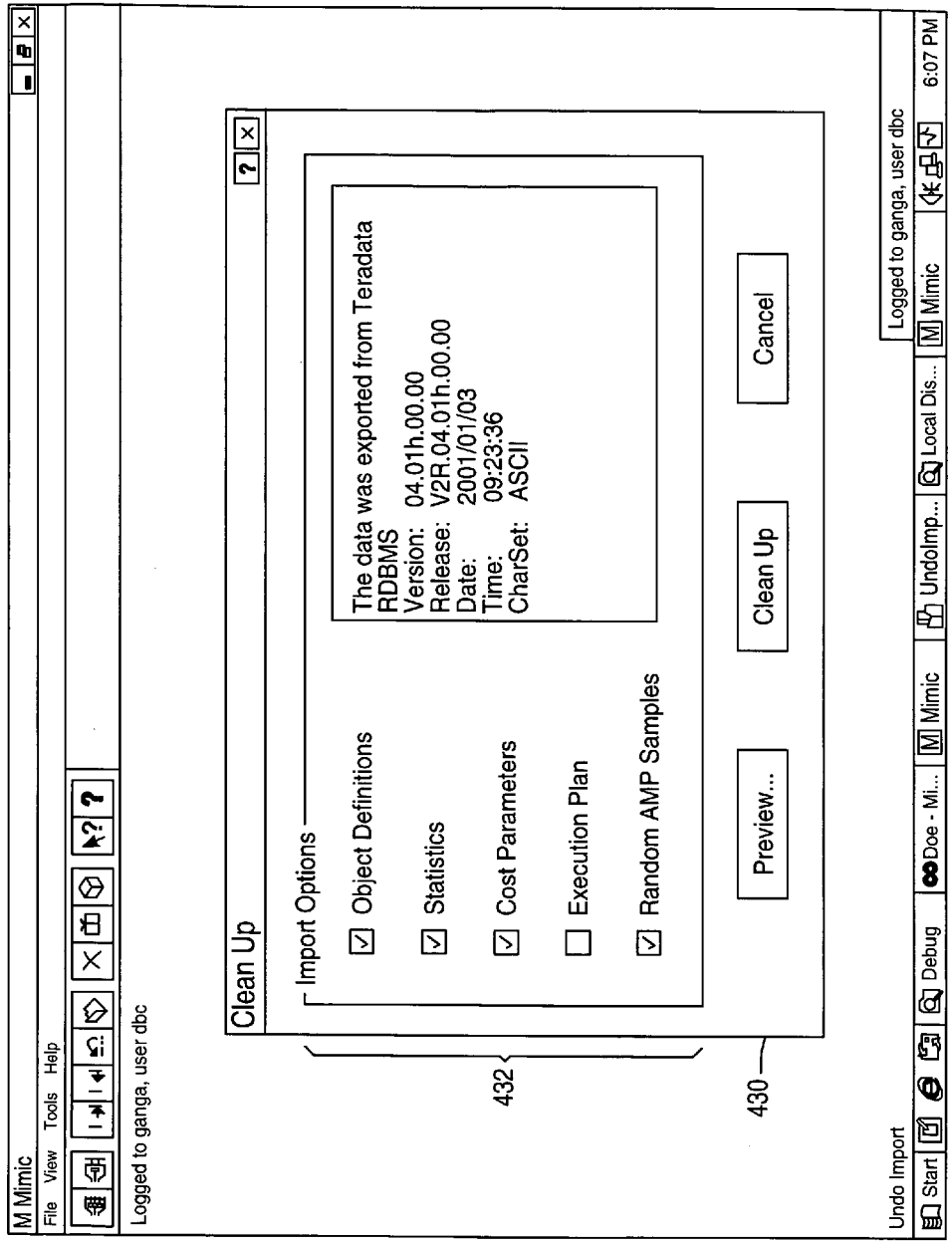

If the Undo Import item in the Tools menu 410 (FIG. 18) is selected, then a Clean Up screen 430 is displayed (FIG. 21). By selecting one or more of the import options 432 in the Clean Up screen, edits made by the user can be undone. Thus, depending on which options are selected, edits made to the object definitions data, statistics data, cost parameters data, and random AMP samples data can be undone.

Referring to FIG. 22, components of the target database system 14 and the test system 10 are illustrated in greater detail. As discussed above, the target database system 14 contains various database-level information, including statistics 156, DDL statements 158, random AMP samples statements 160, actual data 162 associated with the database 32, and other information. In addition, cost-related information may be contained in configuration files 154. In one embodiment, the configuration files 154 are referred to as cost global distributed objects (GDO). The various types of information are stored in one or more storage units 196. Also, the database system 14 includes one or more control units 194 on which various software modules are executable.

To export or extract target information, an export module 190 is capable of responding to requests from the system emulation tool 22 (FIG. 1) by retrieving the requested information. Desired statistics 156, DDL statements 158, random AMP samples 160, user data 162, and cost-related information is extracted and communicated across the network 12 to the emulation client system 20.

The exported TLE data is communicated from the emulation client system 20 to the test system 10 in an import process. Once imported, the TLE data is applied to appropriate locations in the test system 10 (e.g., relational tables, files, and other locations). For example, the extracted statistics, DDL statements, random AMP samples, and user data may be stored in locations 170, 172, 174, and 176, respectively, by an import module 191 running on one or more control units 184 in the test system 10. The imported TLE data is stored in one or more storage units 186.

In addition, the import module 191 maps the extracted cost information into a cost table 180, which is a relational table. In one embodiment, the diagnostic query statement, which is a SQL statement, includes a diagnostic Dump Costs statement. The diagnostic Dump Costs statement dumps the extracted cost information into rows of the cost table 180.

The various software modules or routines discussed herein, such as the optimizer module 18, the system emulation tool 22, and other software modules or routines are executable on corresponding control units in respective systems. Instructions and data associated with the software modules or routines are stored in respective storage units. Each control unit includes a microprocessor, a microcontroller, a processor card (including one or more microprocessors or microcontrollers), or other control or computing devices. As used here, a "controller" can refer to either hardware or software or a combination of both. In addition, although referred to in the singular, "controller" is also intended to cover multiple hardware components, multiple software components, or a communication thereof.

Each storage unit includes one or more machine-readable storage media for storing data and instructions. The storage media includes different forms of memory including semiconductor memory devices, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tapes; an optical media such as compact disks (CDs) or digital video disks (DVDs). Instructions that make up the various software routines or modules in the various systems or nodes are stored in the respective storage units. The instructions, when executed by a respective control unit, causes the corresponding system to perform programmed acts.

The instructions of the software routines or modules are transported to a system in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireline links, cables, and the like), communicate the code segments, including instructions, to the network element. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
presenting a user interface in a display of a test system;
receiving user selection of user-selectable elements in the user interface pertaining to environment information of a target database system to extract from the target database system, the environment information including at least a number of nodes of the target database system;
receiving, by the test system, the environment information extracted based on the user selection from the target database system, wherein the test system is separate from the target database system;
emulating the target database system in the test system using the received environment information;
generating an execution plan for a query based on an emulated database environment created by emulating the target database system; and
visually displaying steps of the execution plan in the user interface.

2. The method of claim 1, wherein presenting the user interface comprises presenting plural screens each containing at least a graphical user interface element that is user selectable.

3. The method of claim 2, wherein presenting the screens comprises presenting a screen containing graphical user interface elements selectable by a user to select, for extraction, one of environment information associated with an entire database in the target database system and environment information associated with tables referenced by a query.

4. The method of claim 2, wherein receiving user selection of user-selectable elements comprises receiving user selection of graphical user interface elements selectable by a user to select, for extraction, environment information associated with tables referenced by a query.

5. The method of claim 1, wherein receiving user selection of the user-selectable elements comprises receiving user selection of user-selectable elements corresponding to types of environment information to extract from the target database system.

6. The method of claim 1, further comprising displaying the environment information in the user interface.

7. The method of claim 6, wherein presenting the user interface comprises providing a user-selectable element that when activated enables editing of the environment information.

8. The method of claim 1, further comprising storing the received environment information in plural files.

9. The method of claim 8, wherein presenting the user interface comprises presenting a user-selectable element that when activated causes the files to be combined.

10. The method of claim 1, wherein receiving the environment information further comprises receiving at least one of the following information: number of processors per node, statistics, and random samples pertaining to demographics of data stored in the target database system.

11. The method of claim 1, wherein the emulated database environment comprises plural storage modules and plural access module processors to access, in parallel, respective storage modules,
wherein generating the execution plan comprises generating the execution plan for execution by the plural access module processors.

12. A first system comprising:
a processor;
a display;
software executable on the processor to present a user interface in the display,
the user interface comprising user-selectable elements to indicate environment information to export from a target database system separate from the first system, the environment information including at least one of a number of nodes of the target database system, a number of processors per node, disk access speed, and network access speed; and
a controller to:
receive the environment information from the target database system;
emulate the target database system based on the environment information,
generate an emulated database environment based on the emulating,
generate an execution plan for a query based on the emulated database environment, and
display steps of the execution plan in the display.

13. The first system of claim 12, wherein the software is executable on the processor to export the environment information from the target database system.

14. The first system of claim 12, wherein the user interface comprises plural screens containing the user-selectable elements.

15. The first system of claim 14, wherein one of the plural screens contains a first user-selectable element to indicate extraction of environment information associated with a database of the target database system.

16. The first system of claim 15, wherein another one of the plural screens contains a second user-selectable element to indicate extraction of environment information associated with one or more tables associated with a query in the target database system.

17. The first system of claim 16, wherein the other one of the plural screens comprises a query selection element to select one or plural queries for which environment information is to be extracted.

18. The first system of claim 17, wherein the query selection element enables selection of the one or plural queries from a file.

19. The first system of claim 17, wherein the query selection element enables selection of the one or more plural queries from a query capture database.

20. The first system of claim 12, wherein the user-selectable elements indicate one or more types of the environment information to export.

21. The first system of claim 20, wherein the environment information further comprises one or more of the following: statistics information, cost information, information pertaining to definition of relations, and samples of data demographics of access modules in the target database system.

22. The first system of claim 12, wherein the user-selectable elements comprise an element to enable editing of the environment information.

23. The first system of claim 22, wherein the user-selectable elements further comprise another element to undo editing of the environment information.

24. The first system of claim 22, wherein the software is executable to display the environment information in the display.

25. The first system of claim 12, wherein the software is executable to export the environment information from the target database system and subsequently to import the environment information to a test system.

26. The first system of claim 12, wherein the controller comprises plural software modules.

27. An article comprising at least one computer-readable storage medium containing instructions for execution by at least one processor in a first system to:
present a user interface;
receive user selection made in the user interface indicating environment information including at least a number of nodes of the target database system to extract from a target database system separate from the first system;
receive the environment information extracted based on the user selection from the target database system;
emulate the target database system based on the environment information;
generate an execution plan for a query based on an emulated database environment created by emulating the target database system; and
display steps of the execution plan in the user interface.

28. The article of claim 27, wherein the instructions when executed cause the first system to present the user interface by presenting plural screens having user-selectable elements.

29. The article of claim 28, wherein the instructions when executed cause the first system to receive activation of the user-selectable elements to select types of environment information to extract.

* * * * *